US012658017B2

(12) United States Patent
Roodt et al.

(10) Patent No.: US 12,658,017 B2
(45) Date of Patent: Jun. 16, 2026

(54) PERSONAL SAFETY DEVICE AND METHOD

(71) Applicant: EPOWAR LIMITED, Tonbridge (GB)

(72) Inventors: Erin-Jane Roodt, Tonbridge (GB); Maks Rahman, Tonbridge (GB)

(73) Assignee: EPOWAR LIMITED, Tonbridge (GB)

( * ) Notice: Subject to any disclaimer, the term of this patent is extended or adjusted under 35 U.S.C. 154(b) by 189 days.

(21) Appl. No.: 18/574,094

(22) PCT Filed: Jul. 1, 2022

(86) PCT No.: PCT/GB2022/051709
§ 371 (c)(1),
(2) Date: Dec. 26, 2023

(87) PCT Pub. No.: WO2023/275567
PCT Pub. Date: Jan. 5, 2023

(65) Prior Publication Data

US 2024/0290190 A1 Aug. 29, 2024

(30) Foreign Application Priority Data

Jul. 2, 2021 (GB) ..................................... 2109617

(51) Int. Cl.
*G08B 3/10* (2006.01)
*G08B 5/22* (2006.01)
*G08B 21/04* (2006.01)

(52) U.S. Cl.
CPC ........... *G08B 21/0453* (2013.01); *G08B 3/10* (2013.01)

(58) Field of Classification Search
None
See application file for complete search history.

(56) References Cited

U.S. PATENT DOCUMENTS 10,096,234 B1 * 10/2018 Chun .................... G10L 15/063
10,198,928 B1 * 2/2019 Ross ...................... A61B 5/746
(Continued)

FOREIGN PATENT DOCUMENTS

EP 3288000 A1 2/2018
EP 3217865 B1 3/2021

OTHER PUBLICATIONS

Patel Jayun et al., "Smart bracelets: Towards automating personal safety using wearable smart jewelry," 2018 15th IEEE Annual Consumer Communications & Networking Conference (CCNC), IEEE, Jan. 12, 2018, DOI: 10.1109/CCNC.2018.8319327.
(Continued)

*Primary Examiner* — John F Mortell
(74) *Attorney, Agent, or Firm* — Tucker Ellis LLP; Michael G. Craig

(57) ABSTRACT

There is described a method for identifying potential personal safety incidents of an individual (5), the method comprising the steps of receiving a sample data set comprising motion data and vital sign data from one or more sensors (14, 16, 18) associated with the individual, determining one or more motion features and one or more vital sign features, and determining whether the sample data set is indicative of a potential personal safety incident of the individual based on a model and at least one of the motion and vital sign features. The sensors can be provided by a fitness tracker and/or an activity tracker, such as a smartphone and/or a smart watch. The method can also include determining one or more responses such as alerting another party of the potential personal safety incident or triggering a deterrent mechanism.

20 Claims, 14 Drawing Sheets

(56) References Cited

U.S. PATENT DOCUMENTS

| | | | | |
|---|---|---|---|---|
| 12,121,362 | B1* | 10/2024 | Pulkkinen | G16H 50/30 |
| 2002/0008630 | A1 | 1/2002 | Lehrman et al. | |
| 2005/0151642 | A1* | 7/2005 | Tupler | H04W 76/50<br>340/539.18 |
| 2006/0282021 | A1* | 12/2006 | DeVaul | A61B 5/0205<br>600/595 |
| 2008/0001735 | A1 | 1/2008 | Tran | |
| 2012/0101411 | A1* | 4/2012 | Hausdorff | A61B 5/1117<br>600/595 |
| 2015/0269825 | A1 | 9/2015 | Tran | |
| 2016/0356666 | A1* | 12/2016 | Bilal | G01M 3/2807 |
| 2017/0140629 | A1* | 5/2017 | Briggs | G08B 21/0453 |
| 2019/0103007 | A1 | 4/2019 | Tan et al. | |
| 2019/0380662 | A1* | 12/2019 | Kwan | G16H 20/13 |
| 2020/0380840 | A1 | 12/2020 | Galarneau et al. | |
| 2021/0020020 | A1* | 1/2021 | Rothschild | G08B 21/0453 |

OTHER PUBLICATIONS

International Search Report and The Written Opinion rom related PCT Application No. PCT/GB2022/051709, dated Sep. 30, 2022, 21 pages.

United Kingdom Combines Search and Examination Report under Sections 17 and 18(3), UK Intellectual Property Office, dated Aug. 20, 2021, 12 pages.

* cited by examiner

10

10

120

152

PERSONAL SAFETY DEVICE AND METHOD

CROSS-REFERENCE TO RELATED APPLICATIONS

This application is a national phase application of International Application No. PCT/GB2022/051709, filed Jul. 1, 2022, which claims priority to Great Britain Patent Application Serial No. 2109617.7, filed Jul. 2, 2021, all of which are incorporated herein by reference.

The present application relates to a method for monitoring the personal safety of an individual. In particular, embodiments are directed to methods for automatically detecting when an individual may be under threat. Steps for responding to detection of such threats may also be included. In particular, the application relates to using data gathered using sensors in mobile user devices to detect changes in personal safety.

BACKGROUND

Many existing approaches for combatting the fear of attack or assault when walking alone, particularly for women, rely on manual activation by the user, for example to trigger an alarm or distress signal. For example, many rape alarms require mechanical activation such as pressing or pulling a switch in order to emit an uncomfortably loud sound. Equally, software and devices exist that can trigger responses using other inputs such as specific voice commands. However, the utility of such approaches is limited to situations where the user is able to manually activate a device. There are many situations where this may not be possible, for example if the user is in shock, if they are being restrained, or if an attacker has stolen or forcibly removed the relevant device.

Some attempts at automating the detection of and response to assault have been made, but these employ rudimentary detection techniques such as comparing a user's heart rate against thresholds or baseline data. These approaches fail to generalise well for many real-world situations, and as such are often ineffective at detecting and responding to attacks or assaults.

SUMMARY

Aspects of the invention are set out in the independent claims and preferable features are set out in the dependent claims.

There is described herein a method for identifying potential personal safety incidents of an individual, the method comprising the steps of: receiving a sample data set comprising motion data from one or more motion sensors associated with the individual and vital sign data from one or more vital sign sensors associated with the individual; determining a plurality of sample features based on the motion data and the vital sign data, the plurality of sample features comprising one or more motion features and one or more vital sign features; determining whether the sample data set is indicative of a potential personal safety incident of the individual based on a model and on at least one of the one or more motion features and at least one of the one or more vital sign features, the model configured to relate features derivable from motion data and vital sign data to potential personal safety incidents; and outputting the determination of whether the sample data set is indicative of a potential personal safety incident.

Advantageously, using both motion data and vital sign data can allow for more accurate determination of whether the individual has experienced a personal safety incident. For example, these data can be used to compare the motion of the individual with one or more vital signs of the individual and identify discrepancies between the two types of data that may indicate that a personal safety incident has occurred, and which may have been otherwise undetectable had only one data type been used. For example, vital sign data may indicate a user is experiencing a high level of stress, but motion data may indicate the user is not conducting intense movement and so the high level of stress may be down to fear in the situation.

In addition, determining a plurality of sample features based on the motion data and vital sign data can allow the data to be described using a reduced number of variables compared to using the raw data itself, meaning storage and processing of the data, such as when determining whether the sample data set is indicative of a potential personal safety incident, can be more efficient. Advantageously, trends and associations in the data can be identified more quickly.

The at least one motion feature can be determined based on the motion data. Where motion data is derived from at least one accelerometer and at least one gyroscope, the at least one motion feature can comprise at least one acceleration feature and/or at least one orientation feature. The at least one vital sign feature can be determined based on the vital sign data. The at least one vital sign feature can comprise at least one heart rate feature.

When determining whether the sample data set is indicative of a potential personal safety incident, the at least one motion feature and the at least one vital sign feature may both be input into the model.

The term "motion data" as used herein refers to data that is indicative of motion (such as acceleration or changing orientation) of the relevant motion sensor. Generally, the motion sensor is provided in a device that is held by, worn by, or otherwise coupled to the individual's body.

The term "vital sign data" as used herein refers to data that is indicative of a vital sign of the individual. The vital sign data can be raw sensor values from the vital sign sensor or processed sensor data. For example, the vital sign data may be indicative of a heart rate of the user, and may be raw sensor values in the form of a time series signal, or it may be processed sensor data based on the raw sensor values, for example in the form of a pulse or a heart rate variability provided at regular intervals.

The motion data may be received from at least a first motion sensor and a second motion sensor associated with the individual. The step of determining the one or more motion features may comprise determining a first motion feature from the motion data from the first motion sensor and determining a second motion feature from the motion data from the second motion sensor. The step of determining whether the sample data set is indicative of a potential personal safety incident may be based on both the first motion feature and the second motion feature.

Using motion data from two motion sensors and two motion features can allow two different types of motion data to be used, meaning different types of motion of the individual can be detected, so potential personal safety incidents can be identified with greater accuracy. For example, if the first motion sensor measures a linear motion and the second motion sensor measures a rotational motion, purely linear, purely rotational and compound linear and rotational motion of the individual can be distinguished.

The first and second motion sensors may be located in substantially the same position on the individual, for example both the first and second motion sensors may be provided in a smart watch or in a device located elsewhere on the individual. For example, the first and second motion sensors may be located proximate to each other such that, if they were the same type of sensor, they would produce very similar data.

The step of determining the plurality of sample features may comprise the step of filtering at least a portion of the sample data set, preferably filtering based on frequency. Advantageously, filtering the data can allow components of the data that occupy different spectral ranges to be isolated and analysed separately. For example, different frequencies of motion and vital signs can be analysed separately, allowing independent sample features corresponding to different frequencies of motion and/or vital signs to be determined, which can enable different types of motion and/or vital sign responses to events or situations to be distinguished. The inventors have found that filtering vital sign data by frequency provides features that allow different stress levels of the individual to be identified more easily. Further, the inventors have found that filtering motion data by frequency allows improved distinction between different levels of physical activity of the individual. Either, or both, of these improvements can lead to improved identification of dangerous or unsafe situations.

The step of determining the plurality of sample features may comprise the step of filtering the motion data based on a plurality of frequency bands. This can allow components of the motion data having different frequencies to be isolated, allowing the individual's motion to be better analysed. For example, higher-frequency motion can correspond to motion of limbs or smaller body parts of the individual, whereas lower-frequency motion can correspond to motion of the entire body or areas of the body of the individual.

The step of determining the plurality of sample features may further comprise the step of determining one or more, preferably at least 3, more preferably at least 10, motion features based on the filtered motion data. Where there are multiple motion sensors, the step of determining one or more motion features based on the filtered motion data can be performed for motion data from each motion sensor.

The step of determining the plurality of sample features may comprise the step of transforming the motion data into a frequency domain to produce first transformed motion data. Transforming the motion data into a frequency domain can include performing a Fourier transform of the motion data such as a Fast Fourier Transform. Transforming the motion data into a frequency domain can allow features of the spectral behaviour of the motion data to be used for determining whether a personal safety incident has occurred, which can help describe the motion data more accurately and thus make a more accurate determination.

The step of determining the plurality of sample features may further comprise the step of, after filtering the motion data, for each of one or more of the frequency bands, transforming the filtered motion data into a frequency domain to produce first transformed motion data. Transforming the filtered data in this way can allow for more efficient data processing, for example if first transformed data is only required for certain frequency bands of the motion data. Advantageously, filtering the motion data then applying a transform can allow frequency-domain features specific to different types of motion to be determined.

The step of determining the plurality of sample features may further comprise the step of determining one or more, preferably at least 3, more preferably at least 10, motion features based on the first transformed motion data.

The step of determining the plurality of sample features may comprise the step of transforming the motion data into a time-frequency domain to produce second transformed motion data. Transforming the motion data into a time-frequency domain can include performing a wavelet decomposition of the motion data, for example using Daubechies wavelets, Haar wavelets or any other type of wavelet. Transforming the motion data into a time-frequency domain can allow features of the spectral behaviour of the motion data over time to be used for determining whether a personal safety incident has occurred, which can help describe the motion data more accurately and thus make a more accurate determination. Motion data transformed into a time-frequency domain, for example using wavelets, can be used to provide more information about the motion data than either the time-domain or frequency-domain motion data alone. For example, the time-frequency domain can include a plurality of spectra corresponding to different resolutions in frequency and/or time, which, for instance, can provide greater resolution in time for higher-frequency components of the data and greater resolution in frequency for lower-signal components of the data. This can allow portions of the motion data corresponding to different frequency components to be analysed in different ways and at different levels of detail, thus overall allowing more information to be extracted from the motion data.

The step of determining the plurality of sample features may further comprise the step of, after filtering the motion data, for each of one or more of the frequency bands, transforming the filtered motion data into a time-frequency domain to produce second transformed motion data. Transforming the filtered data in this way can allow for more efficient data processing, for example if second transformed data is only required for certain frequency bands of the motion data. Advantageously, filtering the motion data then applying a transform can allow time-frequency-domain features specific to different types of motion to be determined.

The step of determining the plurality of sample features may further comprise the step of determining one or more, preferably at least 3, more preferably at least 10, motion features based on the second transformed motion data.

The plurality of frequency bands may comprise: a first band corresponding to low frequencies, preferably having an upper threshold between around 0.3 Hz and 1.5 Hz or between around 0.4 Hz and 1.2 Hz, more preferably having an upper threshold of around 0.5 Hz or around 1 Hz; a second band corresponding to high frequencies, preferably having a lower threshold approximately equal to an upper threshold of the first band and having an upper threshold between around 1.5 Hz and around 4 Hz or between around 1.7 Hz and around 3.5 Hz, more preferably having an upper threshold of around 2 Hz or around 3 Hz; and a third band corresponding to very high frequencies, preferably having a lower threshold approximately equal to an upper threshold of the second band.

The first band may have a size of around 1.5 Hz, preferably around 1 Hz or around 0.5 Hz. The second band may have a size of around 4 Hz, preferably around 3 Hz or around 1.5 Hz. The first band and the second band may be divided by a lower threshold frequency, such as between around 0.3 Hz and 1.5 Hz or between around 0.4 Hz and 1.2 Hz, preferably equal to around 0.5 Hz or around 1 Hz. The second band and the third band may be divided by an upper threshold frequency, such as between around 1.5 Hz and around 4 Hz or between around 1.7 Hz and around 3.5 Hz, preferably equal to around 2 Hz or around 3 Hz.

The step of determining one or more motion features based on the filtered motion data may comprise the step of determining, for each of one or more of the frequency bands, one or more sample motion features based on the filtered motion data within that frequency band.

The one or more sample motion features may comprise at least one of: a range; an average; a variance; a mean-crossing count; a zero-crossing count; a base or fundamental frequency; an interquartile range; an average differential; a standard deviation; a median absolute deviation; an entropy; a kurtosis; a signal magnitude area (SMA); and a correlation coefficient. An average may include a mean, a median or a mode. A mean may include a weighted mean. A mean-crossing count may be indicative of the number of times relevant data passes from above a mean value to below that mean value, and/or vice versa. A zero-crossing count may be indicative of the number of times relevant data changes sign.

The one or more vital sign features comprise at least one of: a range of the vital sign data; an average of the vital sign data; and a variability of the vital sign data. The one or more vital sign features may comprise a variability of the vital sign data, wherein the variability of the vital sign data comprises a ratio of a low-frequency heart rate variability to a high-frequency heart rate variability, wherein the low-frequency heart rate variability corresponds to heart rate signal frequencies below a threshold frequency and the high-frequency heart rate variability corresponds to heart rate signal frequencies above the threshold frequency. The low-frequency heart rate variability may be indicative of parasympathetic nervous system activity, and the high-frequency heart rate variability may be indicative of sympathetic nervous system activity.

Parasympathetic nervous system activity can be indicative of physical stress and can be associated with the human body's "rest-and-digest" or "feed-and-breed" activities. Sympathetic nervous system activity can be indicative of psychological stress or adrenal responses and can be associated with "fight-or-flight" responses.

The term "heart rate variability" as used herein refers to any measure of the variation in time period between consecutive heart beats. For example, heart rate variability may be determined as a variance of a signal comprising values of time periods between consecutive heart beats. The time period signal of which the variance is calculated for determining heart rate variability may have a length of around 200 data points, or between around 2 and 3 minutes. A low-frequency heart rate variability may be a variance of a time period signal filtered to only include low frequencies. A high-frequency heart rate variability may be a variance of a time period signal filtered to only include high frequencies. The time period values of a time period signal may be calculated based on heart rate data. For example, where heart rate data values have the units of beats per minute, the time period value in seconds corresponding to each heart rate data value can be calculated by dividing 60 by the heart rate data value.

The threshold frequency may be between around 0.2 Hz and around 1 Hz or between around 0.4 Hz and around 0.8 Hz, preferably equal to around 0.6 Hz. The low-frequency heart rate variability may correspond to heart rate signal frequencies having a lower threshold between around 0 Hz and around 0.3 Hz or between around 0.1 Hz and around 0.2 Hz, preferably around 0.16 Hz. The high-frequency heart rate variability may correspond to heart rate signal frequencies having an upper threshold between around 3 Hz and around 7 Hz or between around 4 Hz and around 6 Hz, preferably around 5 Hz.

The motion data may comprise acceleration data. The motion data may comprise gyroscope data. The motion data comprising gyroscope data can allow rotational motion of the individual to be detected, so potential personal safety incidents can be identified with greater accuracy. For example, rotational motion of the individual may indicate whether they are falling, have been struck, are being grabbed or any other kind of physical event involving rotation. This can allow purely rotational and compound rotational motion of the individual to be detected.

The vital sign data may comprise heart rate data, optionally heart rate variability data. The motion data may comprise multiaxial data corresponding to 2 or more axes, preferably 3 axes. The motion features may comprise at least one motion feature for each axis of the motion data.

The method may further comprise the step of determining one or more responses based on the determination of whether the sample data set is indicative of a potential personal safety incident. This can allow an individual who is experiencing a personal safety incident to receive assistance or for an attacker to be deterred.

The method may further comprise the step of assigning one or more probabilities associated with the determination of whether the sample data set is indicative of a potential personal safety incident based on the model and the plurality of sample features. The step of determining the one or more responses may be further based on the one or more probabilities. This can allow the severity of the determined response to be in proportion to or appropriate for a degree of confidence with which the potential personal safety incident is determined.

The model may be an activity classifier, such as a recurrent neural network, a decision tree model and/or a Markov chain model, configured to receive as input the plurality of sample features and provide as output a determination of whether the sample data set is indicative of a potential personal safety incident. Recurrent neural networks are well-suited to handling large quantities of time-series data and automatically making inferences based on input data, and have the ability to generalise well. Since they are recurrent, recurrent neural networks have the ability to "remember" previous inputs, so can make inferences based on a number of previous sample data sets. Thus, using a recurrent neural network allows accurate determinations of whether personal safety incidents have occurred using large quantities of time series data. The recurrent neural network may be further configured to provide as output the one or more probabilities. The potential personal safety incident may comprise at least one of: the individual experiencing fear; the individual experiencing surprise; and the individual struggling.

The model may be configured to: determine a level of stress of the individual indicated by the motion data; determine a level of stress of the individual indicated by the vital sign data; and determine whether the sample data set is indicative of a potential personal safety incident of the individual based on a difference between the level of stress indicated by the motion data and by the vital sign data. For example, determining the level of stress indicated by the vital sign data is higher than the level of stress indicated by the motion data may indicate a potential safety incident. Additionally or alternatively, the model may be configured to: identify based on the motion data an intentional motion of the individual; and identify based on the vital sign data an unintentional stress of the individual that is simultaneous with the intentional motion.

The method may further comprise the steps of: sending to the individual a personal safety verification request; and monitoring for a user input via a user interface, the user input being in response to the request. The step of determining the one or more responses may be further based on the outcome of monitoring for the user input. This can allow the method to correct for erroneous determinations that the sample data set is indicative of a potential personal safety incident. Additionally or alternatively, the method may comprise the steps of: sending to the individual a personal safety verification request; and receiving from the individual a personal safety verification. The step of determining the one or more responses may be further based on the personal safety verification.

The one or more motion sensors may be configured to measure at least one of an acceleration and an orientation. The one or more vital sign sensors may be configured to measure at least one of a pulse, a heart rate variability, a blood pressure, a sweat property, a temperature, a breathing rate, an adrenaline level and a blood oxygen saturation level. A sweat property may be a chemical property of sweat of the individual, such as a level of glucose, salt, lactate, or an ion, or a pH. A sweat property may be a physical property of sweat of the individual, such as a temperature, a viscosity, or a density.

The one or more determined responses may comprise triggering an alarm. The alarm may be triggered on an alarm device configured, in response to the alarm being triggered, to emit a high-volume sound, preferably between around 100 dB and around 300 dB or between around 120 dB and around 200 dB, more preferably between around 130 dB and around 180 dB. The alarm device may be different from the device or devices on which the one or more motion sensors and the one or more vital sign sensors are provided. In this case, the alarm device can communicate wirelessly with the device or devices on which the sensors are provided. The one or more determined responses may comprise signalling an alert to a third party. The third party may be an emergency service or a second individual located nearby to the individual.

The motion data and/or the vital sign data may be time series data. The sample data set may comprise one or more timestamps each indicative of a time when the motion data were captured by the one or more motion sensors and/or when the vital sign data were captured by the one or more vital sign sensors.

The method may further comprise the step of determining a sampling frequency associated with the sample data set. The plurality of sample features may be determined if the sampling frequency is above a sampling frequency threshold, preferably at least around 5 Hz. In some examples, the sampling frequency threshold may be between around 3 Hz and around 20 Hz, or between around 4 Hz and 10 Hz. The sampling frequency may be determined based on the one or more timestamps.

There is also described herein a method for identifying potential personal safety incidents of an individual, the method comprising the steps of: receiving a packet comprising a plurality of sample data sets; and for one or more of the sample data sets, performing any method described above.

Each packet may comprise motion data and vital sign data corresponding to at least around 10 points in time. The term "points" as used herein refers to data points or data values and can include one or more discrete time series signals having one or more dimensions. Each packet may comprise motion data and vital sign data corresponding to a time period of at least around 2 seconds. The time period of each packet may be between around 1 second and around 100 seconds, or between around 2 seconds and around 30 seconds, preferably between around 5 seconds and 20 seconds.

There is also described herein a method of training a model for relating one or more potential personal safety incidents of an individual to features derivable from a data set comprising motion data and vital sign data, the method comprising: receiving a plurality of training data sets, each training set comprising motion data from one or more motion sensors associated with an individual over a training time period and vital sign data from one or more vital sign sensors associated with the individual over the training time period; receiving for each training data set a label indicative of whether conditions corresponding to a personal safety incident of the individual occurred during the training time period; determining for each training data set a plurality of training features based on the motion data and the vital sign data, the plurality of training features comprising one or more motion features and one or more vital sign features; determining a measure of dependence between the labels and at least one of the one or more motion features and at least one of the one or more vital sign features; and creating a model based on the determined measure of dependence, wherein the model is configured to relate a potential personal safety incident of an individual to features derivable from a data set comprising motion data and vital sign data.

The one or more motion features and the one or more vital sign features may both be used in the determination of the measure of dependence. Determining a measure of dependence between the labels and at least one of the one or more motion features and at least one of the one or more vital sign features may comprise determining a measure of dependence between the labels and the value each of the features takes in the data sets.

The method may further comprise identifying a label for each training data set by identifying the label based on the training data set. The step of identifying a label may further comprise the steps of: receiving data from a human operator relating to one or more known occurrences of conditions corresponding to a personal safety incident of the individual during the training time period; and updating the label based on the data received from the human operator. This can allow ground truth labels to be obtained from a human operator for training a model for identifying personal safety incidents. By identifying the label first and then updating the label using data received from a human operator, the time required to label training data sets can be reduced since the human operator may only need to provide labels for certain training data sets.

The vital sign data may comprise heart rate data. For each training data set, the step of identifying the label based on the training data set may comprise the steps of: determining a measure of heart rate variability based on the heart rate data; comparing the measure of heart rate variability to a heart rate variability threshold; and identifying the label based on the comparison of the measure of heart rate variability to the heart rate variability threshold.

The measure of heart rate variability may be a ratio of a low-frequency heart rate variability to a high-frequency heart rate variability. The low-frequency heart rate variability may correspond to heart rate signal frequencies below a threshold frequency and the high-frequency heart rate variability may corresponds to heart rate signal frequencies above the threshold frequency. The threshold frequency may be between around 0.2 Hz and around 1 Hz or between around 0.4 Hz and around 0.8 Hz, preferably equal to around 0.6 Hz. The low-frequency heart rate variability may correspond to heart rate signal frequencies having a lower threshold between around 0 Hz and around 0.3 Hz or between around 0.1 Hz and around 0.2 Hz, preferably around 0.16 Hz. The high-frequency heart rate variability may correspond to heart rate signal frequencies having an upper threshold between around 3 Hz and around 7 Hz or between around 4 Hz and around 6 Hz, preferably around 5 Hz. The heart rate variability threshold may be between around 0 and around 0.2, preferably around 0.1.

The motion data may comprise multiaxial data corresponding to 2 or more axes. For each training data set, if the measure of heart rate variability is less than the heart rate variability threshold, the step of identifying the label based on the comparison of the measure of heart rate variability to the heart rate variability threshold may comprise the steps of: for each axis of the motion data, calculating a mean-crossing count indicative of the number of times the motion data passes from above a mean value to below that mean value and/or vice versa during the training time period, and/or for each axis of the motion data, calculating a zero-crossing count indicative of the number of times the motion data changes sign during the training time period; and identifying the label based on one or more of the mean-crossing counts and/or one or more of the zero-crossing counts.

The term “mean-crossing count” as used herein refers to a number of times that a data crosses its mean value. In other words, it is the sum of: the number of times the data passes from above to below its mean, and the number of times the data passes from below to above its mean. Similarly, the term “zero-crossing count” as used herein refers to a number of times that data crosses a zero value or changes sign. In other words, it is the sum of: the number of times the data passes from above a zero value to below that zero value, and the number of time the data passes from below the zero value to above the zero value.

For each training data set, the step of identifying the label based on one or more of the mean-crossing counts may comprise the steps of: comparing one or more of the mean-crossing counts to a mean-crossing threshold; and identifying the label based on the comparison with the mean-crossing threshold. The mean-crossing threshold may be less than 2, preferably equal to 1.

For each training data set, the step of identifying the label based on the comparison with the mean-crossing threshold may comprise the step of identifying the label if one or more of the mean-crossing counts are greater than the mean-crossing threshold. The label may indicate that the individual experienced fear during the training time period.

For each training data set, the step of identifying the label based on one or more of the zero-crossing counts may comprise the steps of: comparing the zero-crossing counts of two or more axes of the motion data; and identifying the label based on the comparison between zero-crossing counts.

For each training data set, the step of identifying the label based on the comparison between zero-crossing counts may comprise the step of identifying the label if one or more of the compared zero-crossing counts are different. The label may indicate that the individual experienced surprise during the training time period.

For each training data set, the step of identifying the label based on one or more of the mean-crossing counts comprises the steps of: comparing the mean-crossing counts of two or more axes of the motion data; and identifying the label based on the comparison between mean-crossing counts.

For each training data set, the step of identifying the label based on the comparison between mean-crossing counts may comprise the step of identifying the label if one or more of the compared mean-crossing counts are different. The label may indicate that the individual struggled during the training time period.

For each training data set, the training time period may be at least around 1 minute, preferably at least around 2 minutes, more preferably at least around 5 minutes. The training time period may be less than around 1 hour, preferably less than around 30 minutes, more preferably less than around 15 minutes.

The model received in a method for identifying potential personal safety incidents of an individual as described above may be built according to the present method for building a model.

There is also described herein a computer-readable storage medium comprising instructions which, when executed on a processor, cause the processor to perform a method substantially as described above.

There is also described herein a mobile device comprising: a processor; a communications interface; and a memory comprising instructions which, when executed by the processor, cause the mobile device to perform a method substantially as described above. The mobile device may receive data from one or more motion sensors and one or more vital sign sensors via the communications interface. In some embodiments, the motion and/or vital sign sensors are integrated in the mobile device.

There is also described herein a remote server comprising: a processor; a communications interface; and a memory comprising instructions which, when executed by the processor, cause the remote server to perform a method described above. The remote server may receive motion data and vital sign data from one or more motion sensors and one or more vital sign sensors, or from a mobile device, via the communications interface.

There is also described herein a system for identifying potential personal safety incidents of an individual, the system comprising: one or more motion sensors and one or more vital sign sensors; a mobile device comprising a processor, a communications interface, and a memory; and a remote server comprising a processor, a communications interface, and a memory. The memory of the remote server may comprise instructions which, when executed by the processor of the remote server, cause the system to perform a method described above. The memory of the mobile device may comprise instructions which, when executed by the processor of the mobile device, cause the system to perform a method described above. The sample data set and/or the plurality of training data sets of a method described above may be received at the remote server from the mobile device. The mobile device may be configured to transmit the motion data and vital sign data to the remote server.

There is also described herein a device for responding to personal safety incidents of an individual, the device comprising: a wireless receiver configured to receive signals using a wireless communication protocol; an alarm configured to emit sound; and a processor configured to cause the alarm to emit sound in response to receiving a trigger signal via the wireless receiver.

When an individual is experiencing a personal safety incident, the device emitting sound can serve to attract attention from nearby people who may be able to help the individual, or it can serve to deter an attacker. The alarm may be configured to emit high-volume sound, preferably between around 100 dB and around 300 dB or between around 120 dB and around 200 dB, more preferably between around 130 dB and around 180 dB. The sound may therefore cause discomfort to the human ear, providing a further deterrent effect for an attacker. Advantageously, a much louder sound than could be emitted from a conventional user mobile device.

The wireless communication protocol may be one of Bluetooth®, Bluetooth® Low Energy, near-field communication, RFID or Zigbee®. Such protocols are widely used, for example in mobile user devices such as smartphones or smart watches, meaning such a device can be used to trigger the device.

The processor may be further configured to stop the alarm from emitting sound in response to receiving a stop signal via the wireless transceiver. The device may further comprise a mechanism configured to be manually activated and/or deactivated. The processor may be further configured to cause the alarm to emit sound in response to the mechanism being manually activated. This can allow an individual to trigger the alarm even if no trigger signal is sent to the device or received by the device.

The processor may be further configured to stop the alarm from emitting sound in response to the mechanism being manually deactivated. This can allow the individual to easily stop the alarm from emitting sound, for example if it had been triggered by accident or if a personal safety incident has passed. The processor may be configured to stop the alarm from emitting sound in response to the mechanism being manually activated only once the stop signal has been received. This can prevent an attacker from deactivating the alarm or from forcing or coercing the individual to deactivate the alarm unwillingly.

The device may further comprise a magnetic fastener. This can allow the device to be easily attached to objects made of ferrous materials, such as a keyring or a component of a bag.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Methods and systems are described by way of example only, in relation to the Figures, wherein.

DETAILED DESCRIPTION

Figure 1A:
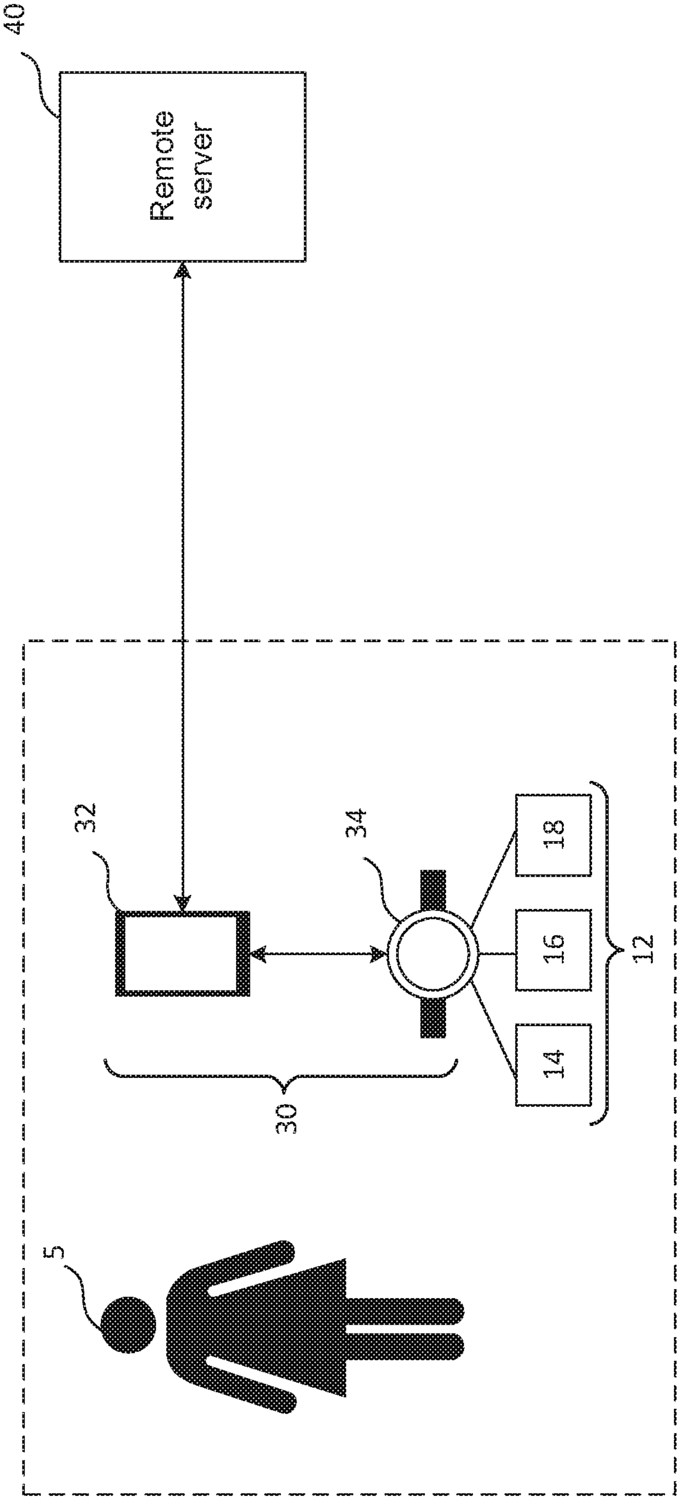
FIGS. 1*a* and 1*b* show (a) a diagram of an example system for identifying potential personal safety incidents and (b) a diagram of another example system for identifying potential personal safety incidents.
Figure 1B:
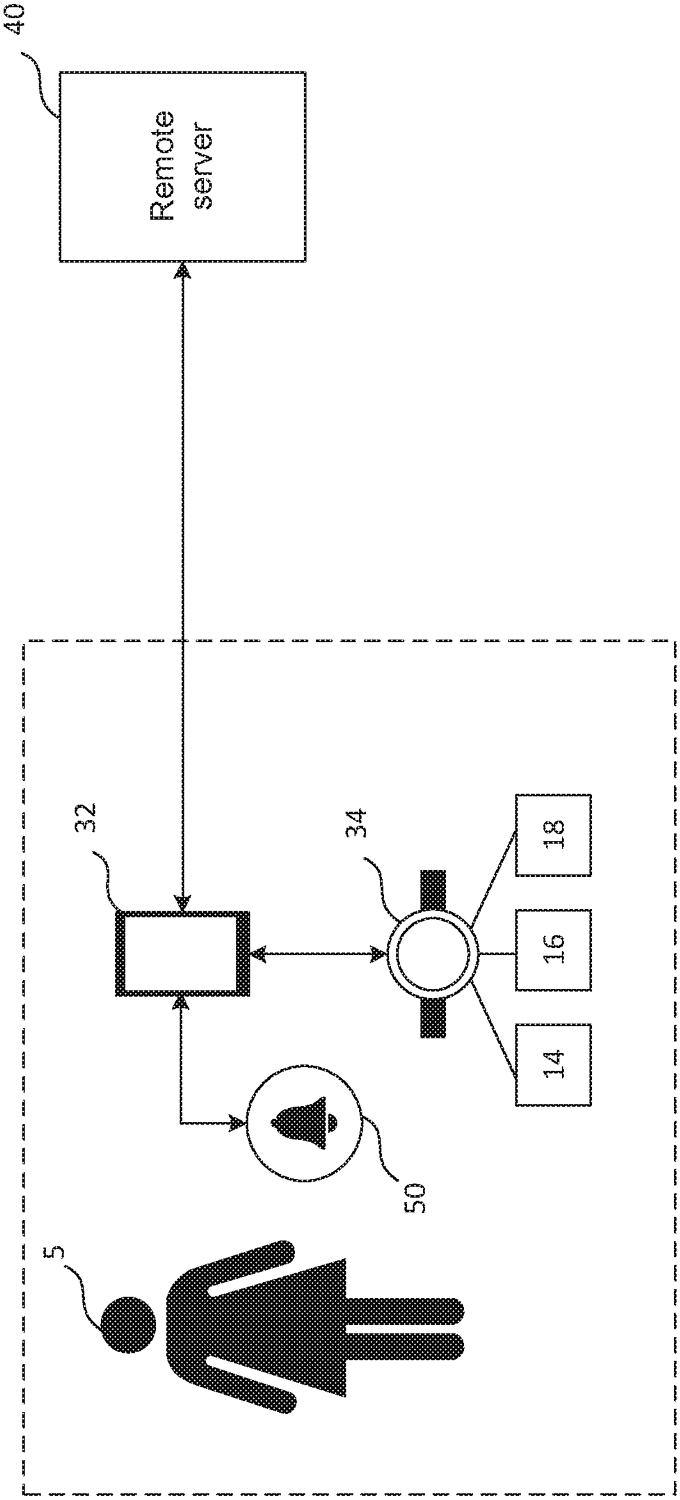

Referring to FIGS. 1*a* and 1*b*, a system 10 for identifying potential personal safety incidents of an individual 5 will now be described. The system 10 comprises one or more sensors 12 integrated in or communicatively coupled to one or more mobile user devices 30 which the individual 5 is in possession of. For example, the sensors 12 may be integrated into a smartphone 32 or a smart watch 34, or any other type of portable sensor device being worn, held or carried by the individual 5. Where there are multiple mobile user devices 30, all of the sensors 12 may be provided in a single mobile user device 30, or the sensors 12 may be provided by different mobile user devices 30.

The sensors 12 include one or more motion sensors 14, 16 configured to capture motion data, and one or more vital sign sensors 18 configured to capture vital sign data. Other sensor types may additionally or alternatively be present. The motion sensors 14, 16 may be provided on different mobile user devices 30, but are preferably located proximate to each other, for example such that if they were the same type of sensor, they would produce very similar data. Therefore, where there are multiple motion sensors 14, 16, the motion sensors 14, 16 are preferably provided on the same mobile user device 30 in order to reduce discrepancies between the motion data that they capture.

In some examples, one or more of the sensors 12 may be configured to wirelessly communicate with one or more mobile user devices 30. Where there are multiple mobile user devices 30, the mobile user devices 30 may also be configured to wirelessly communicate with each other. Wireless communication between sensors 12 and mobile user devices 30, or between mobile user devices 32 and other mobile user devices 34, may be performed using a wireless communication protocol, such as Bluetooth®, Bluetooth® Low Energy, near-field communication (NFC), Zigbee® or radio-frequency identification (RFID). In some examples, as shown in FIGS. 1*a* and 1*b*, a smartphone 32 belonging to the individual 5 is configured to wirelessly communicate with a smart watch 34 being worn by the individual 5.

In the example shown in FIGS. 1*a* and 1*b*, the sensors 12 include two motion sensors, comprising an accelerometer 14 and a gyroscope 16, and one vital sign sensor comprising a heart rate sensor 18. The accelerometer 14 is configured to measure acceleration along one or more, preferably three, axes. The gyroscope 16 is configured to measure angular velocity about one or more, preferably three, axes.

At least one of the mobile user devices 30 is configured to wirelessly communicate with a remote server 40. In some examples, the smartphone 32 is connected to a remote server 40, such as a cloud computing service, via a wireless communication protocol such as Wi-Fi®, 3G, 4G or 5G. Preferably the connection between the smartphone 32 and the remote server 40 is via the Internet.

In the example shown in FIGS. 1*a* and 1*b*, the accelerometer 14, gyroscope 16 and heart rate sensor 18 are integrated in a smart watch 34 being worn by the individual 5. The smartwatch 34 is configured to transmit measurement data gathered using the sensors 12 to the smartphone 32. The smartphone 32 is configured to transmit data based on the measurement data to the remote server 40.

As shown in FIG. 1*b*, some examples of the system 10 also include an alarm device 50. The alarm device 50 is configured to communicate wirelessly with a mobile user device 30 such as the smartphone 32 or smart watch 34. The alarm device 50 has a wireless receiver configured to receive signals via a wireless communication protocol such as Bluetooth®, Bluetooth® Low Energy, NFC, RFID or Zigbee®. The alarm device 50 may also have a wireless transmitter to transmit signals via the wireless communication protocol. The alarm device 50 also has an alarm configured to emit sound, and a processor configured to cause the alarm to emit sound in response to receiving a trigger signal via the wireless receiver. The trigger signal may be received from the smartphone 32, and in some examples originates from the remote server 40.

The alarm is configured to emit a high-volume sound which causes discomfort to nearby humans, for example by virtue of the high volume and/or by emitting a dissonant sound or series of sounds. The power of the sound emitted by the alarm is at least around 100 dB, but in some examples can be greater than 130 dB or between around 130 to 140 dB. Preferably the sound of the alarm is between 100 dB and 300 dB, more preferably between around 120 dB and 200 dB or between around 130 dB and 180 dB.

In some examples, the processor is also configured to stop the alarm from emitting sound in response to receiving a stop signal via the receiver, for example from the smartphone 32; the stop signal may also originate from the remote server 40.

In some examples, the alarm device 50 has a mechanism which can be manually activated and/or deactivated, for example via clicking, pressing, twisting, sliding or any other means of manual activation or deactivation. In some examples, the processor can be configured to cause the alarm to emit sound when the mechanism is manually activated. Additionally or alternatively, the processor can stop the alarm from emitting sound when the mechanism is deactivated. In some examples, the processor stops the alarm from emitting sound in response to the mechanism being deactivated only if a stop signal has been received via the receiver. This means that if the individual 5 is being attacked or assaulted by another person, that person cannot forcefully silence or change the alarm, since an independent stop signal must also be received.

In some examples, the alarm device 50 has a fastening means, such as a magnetic or mechanical fastener, which can allow the alarm device 50 to be easily attached to clothing, luggage and/or personal items such as keyrings or smartphone cases.

Although in the above description and in FIGS. 1*a* and 1*b*, the motion sensors 14, 16 and the vital sign sensor 18 are integrated in a single device (the smart watch 34), in alternative embodiments they may be provided in two or more devices. For example, the vital sign sensor 18, such as a heart rate sensor, may be provided in a first device such as a smart watch 34, while the one or more motion sensors, such as an accelerometer 14 and gyroscope 16 can be provided in a second device such as a smartphone 32. In these examples, the smart watch 34 is configured to gather heart rate measurement data from the heart rate sensor 18 and transmit that heart rate measurement data to the smartphone 32. The smartphone 32 is configured to receive the heart rate measurement data from the smart watch 34, and to gather motion measurement data from the accelerometer 14 and gyroscope 16. The smartphone 32 is further configured to transmit data based on the heart rate measurement data and the motion measurement data to the remote server 40.

Figure 2A:
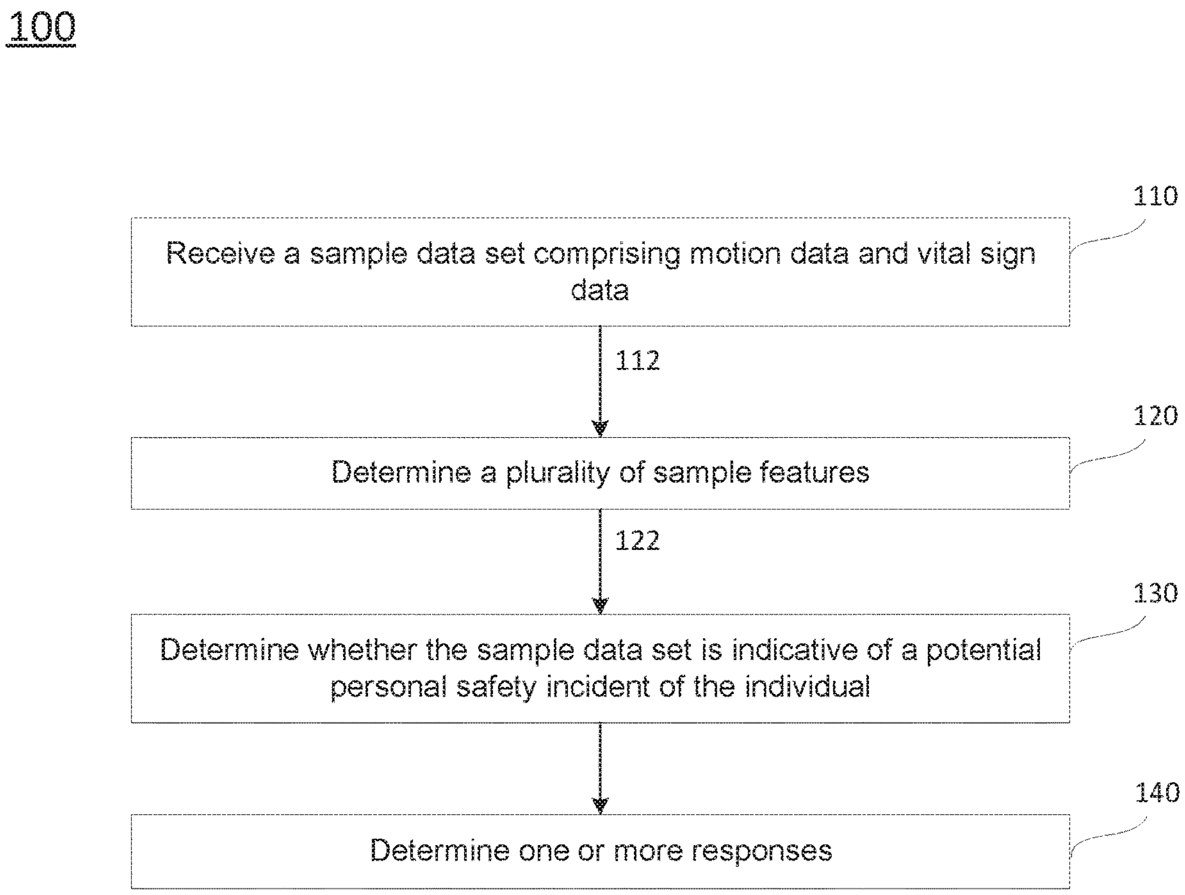
FIGS. 2*a* to 2*c* show (a) a diagram of a method for identifying potential personal safety incidents, (b) a diagram of a method for determining sample features and (c) a diagram of a method for determining motion features.

Referring to FIG. 2*a*, a method 100 for identifying potential personal safety incidents of an individual 5 will now be described. The method 100 may be performed with the system 10 described herein or any other system having sensors associated with an individual.

The method 100 first comprises receiving 110 a sample data set 112 from at least two sensors 14, 16, 18. The sample data set 112 comprises motion data 114 and vital sign data 116. The motion data 114 is gathered using one or more motion sensors 14, 16 associated with the individual 5, and the vital sign data is gathered using one or more vital sign sensors 18 associated with the individual 5. The motion data 114 and vital sign data 116 comprise time series data that are indicative of a series of values measured over a time period. In some examples, this time period has a duration of around 2 or 3 minutes and is the most recent period of this duration for which motion data and vital sign data are available. In some examples, the time series data of the motion data 114 and the vital sign data 116 are indicative of a series of values measured at regular or varying time intervals. The time intervals are between around 1 ms and 500 ms, or between around 10 ms and around 300 ms, preferably between around 20 ms and around 200 ms. In some examples, the time intervals are different for the motion data 114 and the vital sign data 116. For example, the time intervals between values of the motion data 114 being measured may be less than around 200 ms, preferably between around 10 ms and 50 ms, or equal to around 25 ms. The time intervals between values of the vital sign data 116 being measured may be longer, for example not less than around 10 ms, or between around 50 ms and 500 ms, preferably around 200 ms.

In some examples, the motion data 114 comprises acceleration data and/or gyroscope data. The acceleration data is gathered by an accelerometer 14 or other sensor configured to measure acceleration and comprises time series data corresponding to accelerations along three axes of the sensor, for example in orthogonal x, y and z directions. Similarly, the gyroscope data is gathered by a gyroscope 16 or other sensor configured to measure angular velocity and comprises time series data corresponding to angular velocities about three axes of the sensor, for example in orthogonal x, y and z directions. The acceleration data and gyroscope data are thus indicative of accelerations and angular velocities of the sensors 14, 16 and the device or devices 32, 34 housing them that are worn by or otherwise associated with the individual 5.

In some examples, the vital sign data 116 includes heart rate data. The heart rate data is gathered by a heart rate sensor 18. The heart rate sensor 18 may be an electrical heart rate sensor such as an electrocardiogramansor or an optical heart rate sensor such as a photoplethysmography (PPG) sensor. The heart rate data is indicative of a heart rate or pulse of the individual 5, and may be time series data corresponding to signals produced by the heart of the individual 5, or may simply be a pulse given as a number of heart beats per unit time (such as beats per minute) that is updated periodically.

At step 120, a plurality of sample features 122 is determined based on the motion data 114 and the vital sign data 116. The sample features 122 include motion features 124 and vital sign features 126. The sample features 122 are typically numerical values determined based on the time series data of the sample data set 112 and may be selected to describe the data in the sample data set 112 with a reduced number of variables compared to using raw sensor data values. This can make subsequent computation based on the sample data set 112 more efficient and aid in identifying trends and links in the data. The motion features 124 can comprise acceleration features and gyroscope features, calculated from the acceleration data and gyroscope data respectively. The vital sign features 126 can include heart rate features based on the heart rate data.

In some examples, the sample features 122 can be statistics derived from the motion data 114 and vital sign data 116, such as average values, ranges, variances, mean-crossing counts, zero-crossing counts, or other descriptors of the behaviour of the motion data 114 or vital sign data 116. For example, the statistics may include an interquartile range, average differential, mean (e.g. a weighted mean), standard deviation, median absolute deviation, base frequency, entropy, kurtosis, signal magnitude area (SMA) and/or a correlation coefficient.

An interquartile range is the difference between the $25^{th}$ and $75^{th}$ percentile of the values of a signal. An average differential is the average differential or gradient of a signal over a period of time. A mean is the average value of a signal. Standard deviation is a measure of the difference between the mean and the maximum/minimum values of a signal. Median absolute deviation is a measure of the difference between the median and the maximum/minimum values of a signal. A base frequency or fundamental frequency is a frequency corresponding to the first peak, or the peak with the largest magnitude in a frequency-domain spectrum of a signal. Entropy is a measure of the amount of information in a signal. Skew is a measure of how asymmetrical a signal is about its mean, e.g. it may be equal to the third central moment of the signal. Kurtosis is a measure of how different a signal is from a Normal distribution, e.g. it may be equal to the fourth central moment of the signal. A signal magnitude area is the average area under multiple signals, e.g. the average of the integrals over each axis of a multi-axial signal. A correlation coefficient is a measure of how strongly one signal correlates to another, e.g. a Pearson's correlation coefficient.

Using the sample features 122, the method 100 then comprises determining 130 whether the sample data set 112 is indicative of a potential personal safety incident of the individual 5. The determination 130 may be done using a model and the sample features 122, for example by inputting the sample features into a model 200. The model is configured to relate a potential personal safety incident of an individual to features (e.g. statistics) derivable from motion data and vital sign data gathered by sensors associated with that individual. The model may include an activity classifier configured to relate features derivable from a sample data set of motion data and vital sign data associated with an individual to classify that individual's activity. The activity classifier may be configured to classify activities as "regular activity", "exercise" and/or "erratic activity". The classification output by the activity classifier can then be used to determine whether the sample data set is indicative of a potential personal safety incident. The model and/or activity classifier may be implemented using various techniques, such as one or more of: decision tree learning, artificial neural networks, deep learning, reinforcement learning, support vector machine clustering, Bayesian networks, logistic regression, inductive logic programming, rule-based learning (e.g. association rule learning), feature learning (e.g. sparse dictionary learning), dimensionality reduction, genetic algorithms, Markov chain models and ensemble learning (e.g. random forests).

The motion features 124 and vital sign features 126 determined at step 120 are features which have high impacts on the determination of whether a data set is indicative of a potential personal safety incident made at step 130. For example, features which have a high impact on a model's classification of regular activity, exercise and/or erratic activity may be determined from the motion data and vital sign data. Regular activity may correspond to an individual being stationary or idle. The impact of an individual feature on the determination (e.g. classification of regular, exercise or erratic activity) made at step 130 can be measured using Shapley additive explanation (SHAP) values to describe the effect of changes in the value of that feature on the determination, such as a model output. In particular, SHAP values can describe the impact that increasing or decreasing a feature value from a learned baseline has on a model's ability to classify regular, exercise or erratic activity.

In some examples, one or more of the vital sign features 126 comprise a measure of how linear a sample of heart rate data is in the sample data set 112. This can allow erratic activity to be identified with greater accuracy. In particular, the inventors have found that linearity in the heart rate data may be indicative of exercise and/or regular activity, whereas non-linearity in the heart rate data may be indicative of erratic activity. Example features indicative of heart rate linearity include an average differential of the heart rate data, which has been found to improve the accuracy of a model 200 in identifying potential personal safety incidents. Additionally or alternatively, a variability of heart rate data and/or an entropy of heart rate data can also be indicative of how linear the heart rate data is, and have been found to improve the accuracy of the model 200 in identifying potential personal safety incidents. In particular, the higher the variability of heart rate data is, the higher the SHAP value is for classifying erratic activity, so the heart rate variability allows the model 200 to accurately identify erratic activity and thus safety incidents.

One or more of the vital sign features 126 can comprise a measure of an amount of change or variation in a sample of heart rate data, which can allow regular activity to be identified with greater accuracy. For example, the inventors have found that a low variation or change in heart rate data can be indicative of regular activity, while a high variation or change can be indicative of exercise or erratic activity. For example, a vital sign feature 126 that comprises a measure of an amount of change or variation in a sample of heart rate data can include a range of the heart rate data.

In preferred embodiments, one or more of the motion features 124 comprises a measure of how powerful or intense the activity of an individual is. This can improve the accuracy in identifying regular motion, where low power or intensity indicating regular activity and higher power or intensity indicating exercise or erratic activity. An example of a measure of how powerful or intense the activity of an individual is would be a signal magnitude area (SMA) of an accelerometer signal in the motion data 114, which has been found by the inventors to improve the accuracy of the model 200 in classifying regular activity, and thus whether there has been a potential personal safety incident. The accelerometer SMA is the average of the integrals of the accelerometer signal over each of its axes. An increased accelerometer SMA value corresponds to a large negative SHAP value when classifying regular activity, meaning a higher accelerometer SMA value is less likely to correspond to regular activity and a lower accelerometer SMA value is more likely to correspond to regular activity.

One or more of the motion features 124 can be a measure of how periodic the motion of an individual is, which can allow exercise to be identified with greater accuracy. A low periodicity may be indicative of erratic activity, while higher periodicity may be indicative of exercise, so the model 200 can use the periodicity of motion data to identify potential personal safety incidents more accurately. For example, the motion features 124 may include one or more correlation coefficients of accelerometer and/or gyroscope data. In particular, each correlation coefficient is a measure of correlation between the signals of two different axes of the accelerometer or gyroscope signal. Thus, in some examples the one or more correlation coefficients can include correlation coefficients between the signals associated with an accelerometer's (and/or gyroscope's) x- and y-axes, x- and z-axes, and/or y- and z-axes. Periodic signals have similar frequencies across each axis, so those axial signals change at similar times and thus have a strong correlation with one another. Accordingly, using one or more correlation coefficients has been found to improve the accuracy of the model 200.

Figure 3A:
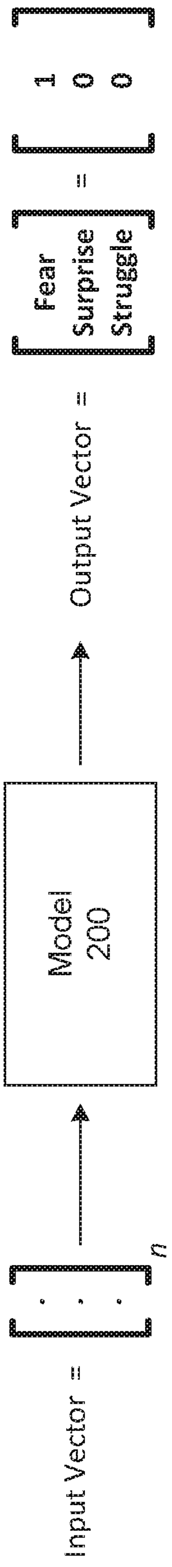
FIGS. 3*a* and 3*b* each show a diagram of an example model.
Figure 3B:
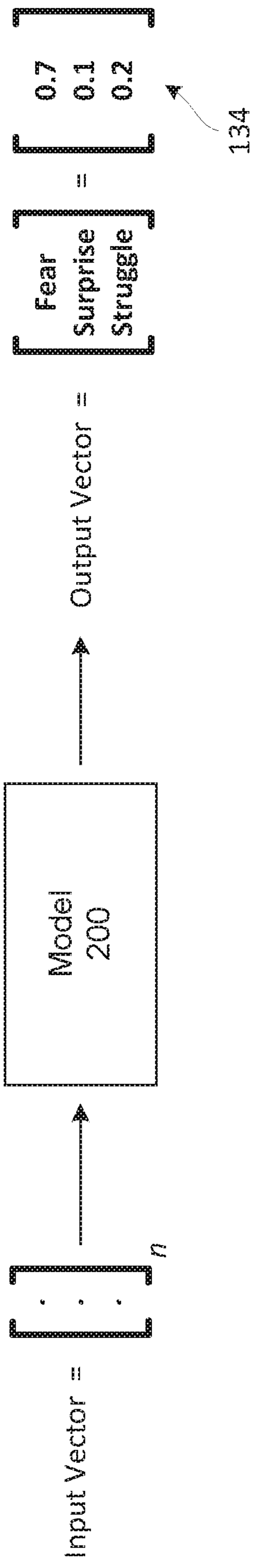

FIGS. 3*a* and 3*b* show examples of using a model 200 that may be used to make the determination 130 in method 100. In some embodiments, the model 200 is a neural network that receives as input the sample features 122 and provides as output a determination of whether a potential personal safety incident has occurred. Methods for building the model 200, or training the neural network, are described in detail below. In some examples, the neural network is a recurrent neural network, which, for each input, allows it to compute outputs based on previous inputs, meaning it is well-suited to receiving inputs based on time series data. For example, the neural network can be a long short-term memory (LSTM) neural network, which allows the network to have a degree of memory through using weights based on a number of previous inputs, such as the previous 5 inputs. The neural network can also include one or more pooling layers. This can improve the ability of the model 200 to generalise for unseen data.

As shown in FIGS. 3*a* and 3*b*, the input to the model 200 may be in the form of an n-dimensional feature vector, where n is the number of sample features 122 extracted at each point in time from the sample data set 112. According to the example of FIG. 3*a*, the output from the model 200 may be an m-dimensional vector whose elements are binary values indicative of whether a potential personal safety incident has occurred. For example, the output may be a single binary value providing a determination of whether such an incident has occurred at all (not shown in FIG. 3*a*). The size of the output vector, m, may be greater than 1, and each element of the output vector may be a binary value indicative of whether a certain event, or type of reaction of the individual 5, has occurred that would indicate a potential personal safety incident. For example, an event might be the individual 5 struggling, being unconscious, or undergoing some other form of erratic or unintentional motion. A reaction can be an emotion such as the individual 5 feeling scared, surprised or stressed. In some examples, the model 200 may also assign one or more probabilities 134 associated with the determination 130 of whether the sample data set 112 is indicative of a potential personal safety incident of the individual 5 based the sample features 122. In this case, as shown in FIG. 3*b*, the model 200 can output one or more confidence levels or likelihoods associated with a potential personal safety incident having occurred. For example, the elements of the m-dimensional output vector of the neural network may be able to take a range of values, such as a decimal value between 0 and 1 or a percentage, that indicate the probability or likelihood of a personal safety incident or of a certain type of event or reaction indicative of a personal safety incident having occurred.

The method 100 may include determining, if each element of the n-dimensional output vector (or scalar) is equal to zero or below a threshold value, that no potential personal safety incidents have occurred, and for example that a status of the individual 5 may be "normal" or of "no concern". In some examples, the method 100 may include determining that no potential personal safety incidents have occurred if all elements of the output vector are below a threshold value, which may be between 10% of a maximum possible value for each element of the output vector, preferably below around 5% or equal to around 1%. Alternatively, the output vector may include an additional element for indicating that no potential personal safety incident had occurred, which element may be a binary value or a decimal value or a percentage as described above.

Returning to FIG. 2*a*, the method 100 then comprises determining 140 one or more responses based on the determination 130 of whether the sample data set 112 is indicative of a potential personal safety incident of the individual 5. This may be performed by providing the output of the model 200 to another model configured to automatically determine an appropriate response based on the output of model 200. If the model 200 determined that there has been a potential personal safety incident, the responses can include: alerting emergency services or a friend or relative of the individual 5 of the potential personal safety incident; triggering a deterrent mechanism carried by or near to the individual 5, such as an alarm which may be provided by the alarm device 50; triggering a visual response such as a light for example provided on the smartphone 32; and/or alerting devices or people nearby to the individual 5 of the potential personal safety incident. In some examples, some responses such as triggering an alarm may only be performed if step 140 determines that a sample data set is indicative of the individual struggling or experiencing surprise. This can help avoid severe responses accidentally being performed inadvertently.

In examples where one or more probabilities 134 are assigned, the step 140 of determining one or more responses is also based on the probabilities 134. For example, the determination 140 of the responses may require probabilities to be above certain thresholds, or for a certain number of outputs from the model 200 to indicate that a potential personal safety incident has occurred. The type or severity of the determined responses can also be dependent on the probabilities 134. For example, a higher probability 134 of a personal safety incident having occurred can result in a stronger response, while a lower probability 134 of a personal safety incident having occurred can result in a weaker or more tentative response.

In some examples, the responses determined at step 140 can include sending a notification to a second individual, such as a designated friend of family member of the individual 5. The notification can indicate that a potential personal safety incident of the individual 5 has occurred, and optionally may indicate the type, or other information, of personal safety incident, event or reaction deemed to have occurred. The notification can include information indicative of a location of the individual 5. For example, the notification may be an SMS text message, containing a descriptor of the individual's location (such as an address, coordinates or a what3words address) and/or a URL for a website or application for displaying the individual's location such as on a map. In some examples, a new notification will be sent each time the location of the individual 5 changes by more than a threshold distance. The threshold distance may be between around 1 m and 50 m, or between around 5 m and 20 m, preferably equal to around 10 m. Alternatively, a single notification may be sent when it is first determined 130 that a sample data set is indicative of a potential personal safety incident, and the notification and/or a website or application for which a URL is provided in the notification may be updated periodically, for example to provide a live location of the individual 5.

Additionally or alternatively, the responses may include sending a personal safety verification request to the individual 5, for example to check whether the individual is in danger or has experienced, is experiencing, or is about to experience a personal safety incident. In some examples, an input from the individual 5 (or another person or service) can be monitored for. If an input indicates that the individual is safe, then no further responses are performed until a potential personal safety incident is next determined 140. If the input indicates that the individual is unsafe or uncomfortable, or if no input is received, further responses as described herein may then be performed.

In some examples, the individual 5 may elect to share their location with a second individual (such as a friend or family member). The second individual may be able to view a location or descriptor thereof of the individual 5 via an interface, such as a user interface provided by an application on a mobile user device. In preferred embodiments, the second individual can view a live location of the individual 5 on a map, optionally with a descriptor such as an address or what3words address that is periodically updated. The provision of a live location of the individual 5 to a second individual may be continuous regardless of whether a potential personal safety incident is determined 140 to have occurred, and may be initiated and/or terminated by the individual 5 and/or the second individual. Alternatively, the provision of a live location of the individual to a second individual may be in response to determining 140 that a potential personal safety incident has occurred. If it is determined 140 that a sample data set is indicative of a potential personal safety incident of the individual 5, the second individual may receive, for example via a user interface provided by an application on a mobile user device, a notification that the individual 5 has experienced a potential personal safety incident. The appearance of the notification, the type of the notification and/or how many times the notification is resent may depend on the type of safety incident, event or reaction that is determined to have occurred and/or on one or more assigned probabilities.

Figure 2B:
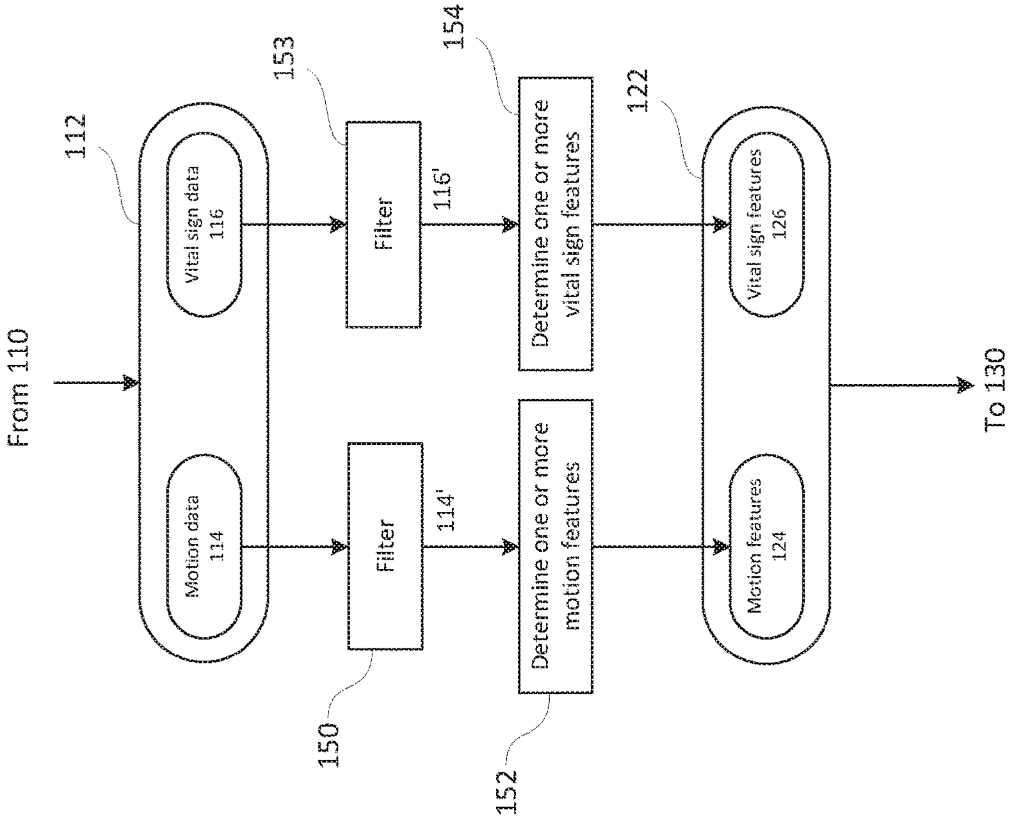

FIG. 2*b* shows an example method of determining sample features 120. In some examples, the method shown in FIG. 2*b* may be performed as part of method step 120 that is shown in FIG. 2*a*. When determining 120 the plurality of sample features 122, the motion data 114 and vital sign data 116 are processed separately. As mentioned above, the motion data 114 and the vital sign data 116 will generally be in the form of a time series of sensor values taken over a sample period. The motion data 114 is first filtered 150 such that the motion data 114 is divided into a plurality of frequency bands, producing filtered motion data 114'. Generally, the motion data 114 is filtered into at least two frequency bands, but in preferred embodiments the motion data 114 may be filtered into more frequency bands, such as three to five frequency bands. The filtering 150 of the motion data 114 may include transforming the motion data 114 into a frequency domain, for example using a Fourier transform, and selecting the motion data 114 corresponding to the frequency bands based on the transformed data before transforming the selected data back into a time domain, for example using an inverse Fourier transform, to produce the filtered motion data 114'. Alternatively, the filtering 150 of the motion data 114 may be performed by applying to the time series motion data 114 one or more time-domain filters corresponding to the frequency bands, such as a Butterworth low pass filter and/or a Butterworth band pass filter. Filtering 150 the motion data 114 using time-domain filters can be more efficient than using an intermediate frequency-domain transform.

The frequency bands may be chosen to correspond to low, high and very high frequencies of motion associated with the individual 5. For example, the low frequency band may correspond to frequencies below around 0.5 Hz or below around 1 Hz, and may be indicative of slow, intense or isometric motion. In other words, the low frequency band may have an upper threshold of around 0.5 Hz or around 1 Hz. In preferred embodiments the upper threshold of the low frequency band is between around 0.3 Hz and 1.5 Hz, preferably around 0.4 Hz to 1.2 Hz.

Generally, the lower threshold of the low frequency band will be 0 Hz. In some embodiments there is an additional, very low frequency band. In such a case the low frequency band would have a lower threshold equivalent to an upper threshold of the very low frequency band. The upper threshold of the very low frequency band may be, for example, between around 0.05 Hz and 0.3 Hz, preferably between around 0.1 Hz and 0.2 Hz, such as around 0.15 Hz.

The high frequency band may correspond to frequencies above the low frequency band, but less than around 2 Hz or less than around 3 Hz, and may be indicative of rapid motion capable of being produced by the human body, including light exercises such as walking or running. In other words, the high frequency band may have an upper threshold of around 2 Hz or around 3 Hz. In preferred embodiments, the upper threshold of the high frequency band is between around 1.5 Hz and around 4 Hz, preferably around 1.7 Hz to 3.5 Hz. Generally, the high frequency band has a lower threshold approximately equal to the upper threshold of the low frequency band.

In some embodiments, there is a medium frequency band corresponding to frequencies between the low frequency band and the high frequency band, which the inventors have found may be useful for identifying slower full-body exercises. In preferred embodiments, the medium frequency band has a lower threshold between around 0.3 Hz and 1 Hz, preferably around 0.5 Hz, and an upper threshold between around 1 Hz and 2 Hz, preferably around 1.5 Hz.

The very high frequency band may correspond to frequencies above the high frequency band, for example above around 2 Hz or 3 Hz, and may be indicative of types of motion that cannot be maintained by the human body without external force inputs, such as from another human or a moving object, or motion that is outside the range of regular human motion. Generally, the very high frequency band has a lower threshold approximately equal to the upper threshold of the high frequency band, and has no upper threshold.

In some embodiments, there is an additional ultra-high frequency band. In such a case, the very high frequency band would have an upper threshold equivalent to a lower threshold of the ultra-high frequency band. The lower threshold of the ultra-high frequency band may be, for example, between around 3 Hz and 10 Hz, preferably between around 4 Hz and 6 Hz, such as around 5 Hz.

In one example, the motion data 114 are filtered at step 150 into four frequency bands: a low frequency band corresponding to frequencies between 0 Hz and 0.5 Hz; a medium frequency band corresponding to frequencies between 0.5 Hz and 1.5 Hz; a high frequency band corresponding to frequencies between 1.5 Hz and 2.5 Hz; and a very high frequency band corresponding to frequencies between 2.5 Hz and 5.0 Hz.

Following step 150, the motion features 124 are then determined 152 using the filtered motion data 114'. In the step of determining 152 the motion features 124, features may be determined separately for one or more or each frequency band of the filtered data 114'. For example, where the motion data 114 comprises acceleration data, the acceleration data may indicate forces acting on the individual 5, which can include those produced by different parts of the body of the individual 5. Similarly, where the motion data 114 includes gyroscope data, the gyroscope data may indicate angular velocities produced by the individual 5, including those produced by different body parts of the individual 5. By filtering 150 motion data 114 into different frequency bands, the motion resulting from different parts of the body can be analysed separately, for example motion produced by an individual's legs will generally exhibit a lower range of frequencies than those produced by their arms or other smaller body parts. Filtering 150 thus allows the different types of motion to be isolated and analysed, for example to identify erratic movement associated with certain body parts or frequencies.

In some examples, the motion features 124 include at least one of a range (e.g. an interquartile range), a mean (e.g. a weighted mean), a variance or standard deviation, a mean-crossing count, a zero-crossing count, an average differential, a median absolute deviation, a base frequency, an entropy, a kurtosis, a signal magnitude area (SMA) and/or a correlation coefficient of the filtered motion data 114'. These features can be determined for each frequency band of the filtered motion data 114'.

The mean-crossing count is indicative of the number of times the filtered motion data 114' crosses its mean value in a given time period, and the zero-crossing count is indicative of the number of times the motion data 114 changes sign (crosses a zero value).

Where the motion data 114 is multiaxial, the data corresponding to each axis can be filtered 150 separately into each frequency band, meaning the filtered data 114' comprises a separate set of data for each combination of sensor axis and frequency band. Therefore, in examples where the motion data 114 comprises triaxial acceleration and gyroscope data and the filtering step 150 filters the motion data 114 into three frequency bands, the filtered motion data 114' will include 18 sets of filtered data by filtering 150 each axis of the two data types into three frequency bands. Motion features 124 may then be determined separately for data corresponding to each axis. Motion features 124 for data associated within each axis may further be determined separately for one or more of the frequency bands. Motion features 124 are determined separately for each set of data in the filtered motion data 114'. For example, if five features are calculated for each frequency band of each axis of the acceleration and gyroscope data, 90 motion features 124 are determined based on the filtered motion data 114'.

In some examples, the motion features 124 determined at step 152 include features, for one or more of the frequency bands of data for one or more axes, which measure how repetitive the motion represented by the motion data is. This can improve the model's ability to classify regular, exercise and erratic activities, and thus allow it to more accurately identify whether a potential personal safety incident has occurred. In particular, a high repetitiveness of a signal may be indicative of exercise, a lower repetitiveness may be indicative of regular activity, and an even lower repetitiveness may be indicative of erratic activity. For example, the motion features 124 may include a standard deviation of an accelerometer and/or gyroscope time-domain signal with respect to a specific axis and frequency band. These can include e.g. a standard deviation of an accelerometer's x- and/or z-axis signal in the time-domain that has been filtered according to a medium, high and/or very high frequency band, and/or a standard deviation of a gyroscope's z-axis signal in the time-domain that has been filtered according to a very high frequency band. A signal that repeats in the same way consistently has a low standard deviation, so this statistic can be used to accurately identify different types of activity. As such, a very low standard deviation may be indicative of regular activity, a low standard deviation may be indicative of exercise, and a high standard deviation may be indicative of erratic activity. For example, a very low standard deviation may be less than around 1.0, preferably below around 0.9, a low standard deviation may be between around 1.0 and 3.0, preferably between around 1.0 and 2.5, and/or a high standard deviation may be greater than around 2.0, preferably greater than around 2.5.

In some examples, the motion features 124 include features, for one or more of the frequency bands of data for one or more axes, which measure how repetitive the power or intensity of an activity is. In other words, such features may provide a measure of how sustained the intensity of an activity is. This can improve the model's ability to classify regular, exercise and erratic activities, and thus allow it to more accurately identify whether a potential personal safety incident has occurred. In particular, a high repetitiveness of the power or intensity of a signal may be indicative of exercise and/or erratic activity, while a lower repetitiveness of power/intensity may be indicative of regular activity. For example, the motion features 124 may include a median absolute deviation (MAD) of an accelerometer and/or gyroscope time-domain signal with respect to a specific axis and frequency band. These can include a MAD of an accelerometer's x-, y- and/or z-axis signal in the time-domain that has been filtered according to a low, medium and/or high frequency band, and/or a MAD of a gyroscope's x- and/or y-axis signal in the time-domain that has been filtered according to a low, high and/or very high frequency band. A signal with a sustained or repetitive power level has a higher MAD, whereas more sporadic activity corresponds to a lower MAD, so this statistic can be used to accurately identify different types of activity. Accordingly, a low MAD may be indicative of regular activity, and a high MAD may be indicative of exercise and/or erratic activity. For example, a low MAD may be less than around 0.5, preferably below around 0.4, and/or a high MAD may be greater than 0.5, preferably greater than 1.0, more preferably greater than 1.5.

In some examples, one or more of the motion features 124 are indicative of idle motion. This can improve the accuracy in classifying regular activity, since a low amount of idle activity can indicate exercise or erratic activity and higher amounts of idle activity can indicate regular activity. In one example, since the inventors have found that non-repetitive tasks (e.g. fidgeting) generally correspond to motion within a medium frequency band (e.g. 0.5 Hz-1.5 Hz) with almost no data in low and very high frequency bands (e.g. 0.0 Hz-0.5 Hz and 2.5 Hz-5.0 Hz respectively), statistics of the filtered data 114' specific to such frequency bands can help determine whether idle movement is present. For example, the motion features 124 may include a zero-crossing count of a gyroscope's x- and/or y-axis signal filtered according to a low and/or very high frequency band. The motion features 124 may additionally or alternatively include a mean-crossing count of a gyroscope's y-axis signal filtered according to a high and/or very high frequency band. Accordingly, a low number of zero-crossings and/or mean-crossings may indicate less motion in the various frequency bands, and can improve the accuracy of the output of the model 200.

In some examples, one or more of the motion features 124 are indicative of chaotic movement. In this case, a high degree of chaos may indicate erratic activity, while a lower degree of chaos may indicate exercise or regular activity. Erratic motion typically corresponds to high or very high frequencies, so using features that are indicative of an amount of data or activity within individual frequency bands can improve the accuracy when classifying erratic motion. For example, the motion features 124 can include the mean of an accelerometer's x- and/or z-axis signal that has been filtered according to a low frequency band. Additionally or alternatively, the motion features 124 can include an interquartile range of: an accelerometer's x-axis signal filtered according to a medium frequency band; an accelerometer's y-axis signal filtered according to a low frequency band; a gyroscope's x-axis signal filtered according to a very high frequency band; and/or a gyroscope's y-axis signal filtered according to a high and/or very high frequency band. A higher mean and/or interquartile range within certain frequency bands can thus indicate a greater likelihood of chaotic or erratic motion, while lower values may indicate exercise. Although a lower mean and/or interquartile range in such frequency bands may also indicate regular motion, in some examples these statistics are not considered by the model 200 when identifying regular motion in order to determine whether a potential personal safety incident has occurred. In particular, the interquartile range of a gyroscope's y-axis signal filtered according to a very high frequency band has been found to have a particularly high impact on the ability of the model 200 to distinguish between exercise and erratic activity.

In the example of FIG. 2*b*, after step 110, the vital sign data 116 is also filtered 153 such that the vital sign data 116 is divided into a plurality of frequency bands, producing filtered vital sign data 116'. Generally, the vital sign data 116 is filtered into at least two frequency bands, but in preferred embodiments the vital sign data 116' may be filtered into more frequency bands, such as three to five frequency bands. The frequency bands may be chosen to correspond to very low, low and high frequencies of vital sign signals associated with the individual 5, such as heart rate. Accordingly, in this example the filtered vital sign data 116' and/or the vital sign data 116 are used to determine 154 one or more vital sign features 126, which can include at least one of a range, an average value or a variability of the vital sign data 116 and/or of the filtered vital sign data 116' in one or more of the frequency bands. Where the vital sign data 116 includes heart rate data, the variability may be a measure of heart rate variability. In some examples, the measure of heart rate variability is a ratio of low-frequency heart rate variability to a high-frequency heart rate variability.

The low-frequency heart rate variability can be indicative of parasympathetic nervous system activity of the individual 5 and may be indicative of physical stress that the individual 5 is experiencing. The high-frequency heart rate variability can be indicative of sympathetic nervous system activity of the individual 5 and may be indicative of psychological stress that the individual 5 is experiencing. The low-frequency heart rate variability and the high-frequency heart rate variability may be identified respectively by low frequencies and high frequencies of a heart rate signal. In preferred embodiments, the heart rate signal can be based on heart rate values (or pulse values); for example, a heart rate signal may comprise values indicative of time periods between consecutive heart beats which are determined based on the heart rate values. The low-frequency and high-frequency heart rate variabilities may be variances of the respective low-frequency and high-frequency portions of a heart rate signal, such as a signal comprising values of time periods between consecutive heart beats. The ratio of low-frequency heart rate variability to high-frequency heart rate variability can be indicative of relative parasympathetic to sympathetic nervous system activity, and/or may be indicative of an intensity of a fight-or-flight reaction of the individual 5. For example, the ratio being higher may indicate increased parasympathetic activity or reduced sympathetic activity, and thus a reduced likelihood that the individual 5 is experiencing stress or exhibiting a fight-or-flight response; equally, the ratio being lower may indicate reduced parasympathetic activity or increased sympathetic activity, and thus an increased likelihood that the individual 5 is experiencing stress or exhibiting a fight-or-flight response.

In some examples, the low-frequency heart rate variability is identified by heart rate signal frequencies between around 0.1 Hz to 0.6 Hz, or between around 0.16 Hz and 0.6 Hz. In other words, the low-frequency heart rate variability may correspond to heart rate signal frequencies below a threshold frequency of around 0.6 Hz. In preferred embodiments, the threshold frequency is between around 0.2 Hz and around 1 Hz or between around 0.4 Hz and around 0.8 Hz. The low-frequency heart rate variability may correspond to heart rate signal frequencies having a lower threshold of around 0.1 Hz or around 0.16 Hz. In preferred embodiments, the lower threshold of the low-frequency heart rate variability is between around 0 Hz and around 0.3 Hz, or between around 0.1 Hz and around 0.2 Hz.

In some examples, the high-frequency heart rate variability is identified by heart rate signal frequencies above around 0.6 Hz, optionally below around 5 Hz. In other words, the high-frequency heart rate variability may correspond to heart rate signal frequencies above the threshold frequency, and optionally below an upper threshold of around 5 Hz. In preferred embodiments, the upper threshold is between around 3 Hz and around 7 Hz or between around 4 Hz and around 6 Hz.

Therefore, the step 154 of determining the vital sign features 126 can include the step of determining variabilities within at least two frequency bands (not shown in FIG. 2*b*).

The plurality of sample features 122 comprising the motion features 124 and the vital sign features 126 is then passed to step 130.

Figure 2C:
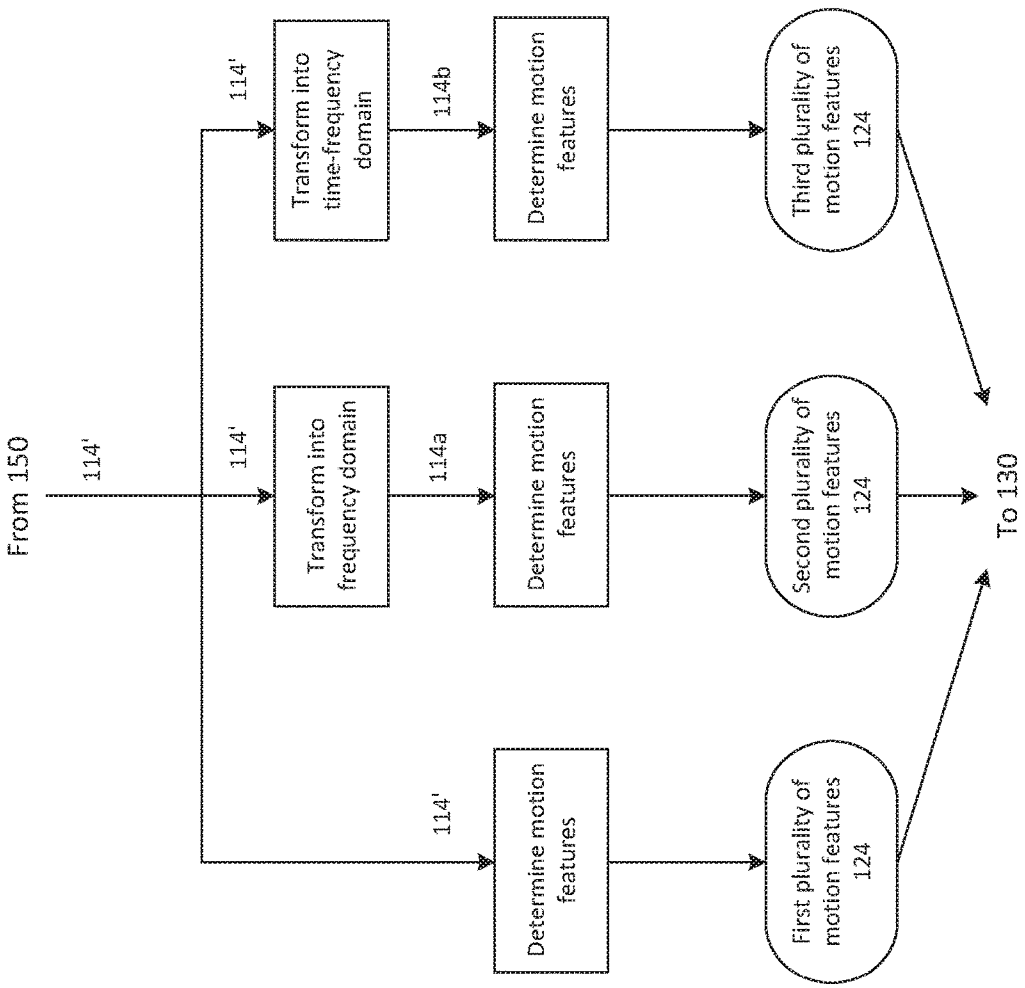

FIG. 2*c* shows example steps for determining motion features 124. The steps shown in FIG. 2*c* may, for example, be used as part of step 152 shown in FIG. 2*b*. First the filtered motion data 114' is received, and a first plurality of motion features 124 is determined based on the filtered motion data 114', as described above in relation to FIG. 2*b*.

According to the method of FIG. 2*c*, in addition, the filtered motion data 114' is transformed into a frequency domain to produce first transformed motion data 114*a*. Transforming the filtered motion data 114' into a frequency domain can include applying a transform such as a Fourier transform to the time series filtered motion data 114' to produce, for each frequency band, a spectrum in a frequency domain. The spectrum may indicate, for example, the relative power or magnitude of different frequencies present in the filtered motion data 114'. The transform may be applied to the filtered motion data 114' by applying an algorithm such as the Fast Fourier Transform (FFT) algorithm to the filtered data in each frequency band of the time series filtered motion data 114'. For example, the produced frequency-domain spectrum (for each frequency band) may be an amplitude spectrum (such as a FFT) or a power spectrum (such as a power spectral density). If the motion data 114 and thus the filtered motion data 114' are multiaxial, the transform may be applied to one or more of, or each, frequency band of each axis of the filtered motion data 114' such that the first transformed motion data 114*a* is also multiaxial.

Alternatively, the first transformed motion data 114*a* may be produced by transforming the motion data 114 (or the motion data associated with each respective axis) directly into a frequency domain rather than performing a separate frequency transform for each frequency band of the filtered motion data 114'.

A second plurality of motion features 124 is then determined based on the first transformed motion data 114*a*. These features can include at least one of a range, an average value (such as a weighted mean), a variance, a base frequency, or a mean-crossing count of the first transformed motion data 114*a*. The base frequency may also be referred to as a fundamental frequency. The mean-crossing count may be indicative of the number of times the first transformed motion data 114*a* crosses its mean frequency value. The weighted mean may refer to an average frequency of the peak frequencies in a signal weighted by the magnitudes of those peak frequencies. If the first transformed motion data 114*a* is multiaxial, then at least one motion feature 124 is determined for one or more of, or each, axis of the first transformed motion data 114*a*. Preferably, at least two and more preferably around five motion features 124 are determined for each frequency band of each axis of the first transformed motion data 114*a*. Therefore, in examples where the motion data 114 comprises triaxial acceleration and gyroscope data and the filtering step 150 filters the motion data 114 into three frequency bands, 90 motion features 124 are determined based on the first transformed motion data 114*a*.

One or more of the second plurality of motion features 124 may measure how powerful or intense the activity of an individual is. This can improve the accuracy in identifying regular motion, where low power or intensity indicates regular activity and higher power or intensity indicates exercise or erratic activity. For example, a standard deviation of a power spectrum of filtered accelerometer data has been found to improve the accuracy of the model 200 in classifying regular activity, and thus its ability to identify potential personal safety incidents. In one example, the second plurality of motion features 124 can include a standard deviation of a power spectral density of an accelerometer's x-, y- and/or z-axis signal filtered according to a medium, high and/or very high frequency band. Additionally or alternatively, as described herein, the signal magnitude area (SMA) of an accelerometer can be used to improve the classification of regular motion in this manner. A lower standard deviation value is likely to be indicative of lower power and thus regular activity, and a higher standard deviation value is likely to be indicative of higher power and thus exercise or erratic activity.

One or more of the second plurality of motion features 124 may measure how fast the activity of an individual is. This can improve the accuracy in distinguishing between exercise and erratic activity, since exercise is typically slower than erratic motion. For example, the mean and base frequency of a power spectrum of filtered accelerometer and gyroscope data have been found separately and in combination to improve the accuracy of the model 200 in classifying exercise and erratic activities, and thus the ability to identify potential personal safety incidents. In one example, the second plurality of motion features 124 can include a mean of a power spectral density of an accelerometer's x- and/or z-axis signal filtered according to a medium and/or high frequency band. The second plurality of motion features 124 can additionally or alternatively include a base frequency of a power spectral density of an accelerometer's y-axis signal filtered according to a very high frequency band, and/or a base frequency of a power spectral density of a gyroscope's y-axis signal filtered according to a low frequency band.

One or more of the second plurality of motion features 124 may be indicative of idle motion. This can improve the accuracy in classifying regular activity, since a low amount of idle activity can indicate exercise or erratic activity and higher amounts of idle activity can indicate regular activity. In one example, since non-repetitive tasks (e.g. fidgeting) have been found to generally correspond to motion within a medium frequency band (e.g. 0.5 Hz-1.5 Hz) with almost no data in low and very high frequency bands (e.g. 0.0 Hz-0.5 Hz and 2.5 Hz-5.0 Hz respectively), frequency-domain statistics of the data 114*a* specific to frequency bands can help determine whether idle movement is present. For example, the second plurality of motion features 124 may include the base frequency of a Fourier transform of an accelerometer's y-axis signal (and/or of a gyroscope's z-axis signal) filtered according to a low frequency band. The second plurality of motion features 124 may additionally or alternatively include the mean and/or entropy of a Fourier transform of an accelerometer's z-axis signal filtered according to a low frequency band. Accordingly, a low base frequency, mean and/or entropy in the low frequency band may indicate regular activity, and higher values of these statistics may indicate exercise or erratic activity.

Alternatively or additionally to producing first transformed motion data 114*a*, the filtered motion data 114' is transformed into a time-frequency domain to produce second transformed motion data 114*b*. Transforming the filtered motion data 114' into a time-frequency domain can include applying a transform such as a wavelet transform to the time series filtered motion data 114' to produce, for each frequency band, a spectrum in a time-frequency plane. The spectrum may indicate, for example, how the relative power or magnitude of different frequencies present in the filtered motion data 114' changes over time. The transform may be applied to the filtered motion data 114' by performing a wavelet decomposition of the time series filtered motion data 114' using Daubechies wavelets, Haar wavelets or any other types of wavelet. The time-frequency spectrum may comprise a plurality of spectra corresponding to different frequency and/or time resolutions. If the motion data 114 and thus the filtered motion data 114' are multiaxial, the transform may be applied to one or more of or each frequency band of each axis of the filtered motion data 114' such that the second transformed motion data 114*b* is also multiaxial. Alternatively, the second transformed motion data 114*b* may be produced by transforming the motion data 114 (or the motion data associated with each respective axis) directly into a time-frequency domain rather than performing a separate time-frequency transform for each frequency band of the filtered motion data 114'.

A third plurality of motion features 124 is then determined based on the second transformed motion data 114*b*. These features can include at least one of a range, an average value, a variance, a mean-crossing count or a zero-crossing count of the second transformed motion data 114*b*. The mean-crossing count is indicative of the number of times, for one or more frequency resolutions, the spectrum of the second transformed motion data 114*b* at each resolution crosses a mean value of that spectrum. If the second transformed motion data 114*b* is multiaxial, then at least one motion feature 124 is determined for one or more of or each axis of the second transformed motion data 114*b*. Preferably, at least two and more preferably around five motion features 124 are determined for each frequency band of each axis of the second transformed motion data 114*b*. Therefore, in examples where the motion data 114 comprises triaxial acceleration and gyroscope data and the filtering step 150 filters the motion data 114 into three frequency bands, 90 motion features 124 are determined based on the second transformed motion data 114*b*.

Therefore, where five motion features are calculated for each frequency band of each axis of the acceleration and gyroscope data of the filtered motion data 114', the first transformed motion data 114*a* and the second transformed motion data 114*b*, there would be a total of 270 motion features 124.

In the above examples, for each frequency band and/or each axis in time, frequency and/or time-frequency domains, more than five motion features 124 may be determined. For example, at least 10 or at least 30 features may be determined for each frequency band and each axis of the filtered motion data, the first transformed motion data and the second transformed motion data.

Motion features 124 may be determined 152 based on any number of the filtered motion data 114', the first transformed motion data 114*a* and the second transformed motion data 114*b*.

Although not shown in FIG. 2*c*, the determination of motion features 124 at step 152 may include transforming the filtered motion data 114' into an alternative time domain to produce third transformed motion data 114*c*. In one example, transforming the data 114' into an alternative time domain includes computing the third transformed motion data as the autocorrelation function of the filtered motion data 114'. In this case, the third transformed motion data 114*c* can indicate how the filtered motion data 144' correlates with increasingly delayed versions of itself, which can allow repeating patterns to be identified in the data. If the motion data 114 and thus the filtered motion data 114' are multiaxial, the autocorrelation function may be computed for one or more frequency bands for one or more axes of the filtered motion data 114', for example such that the third transformed motion data 114*c* is also multiaxial. Alternatively, the third transformed motion data 114*c* may be produced by transforming the motion data 114 (or the motion data associated with each respective axis) directly into an alternative time domain rather than transforming each frequency band of the filtered motion data 114' separately.

A fourth plurality of motion features 124 is then determined based on the third transformed motion data 114*c*. These features can include at least one of a range (e.g. an interquartile range), a mean (e.g. a weighted mean), a variance or standard deviation, a mean-crossing count, a zero-crossing count, an average differential, a median absolute deviation, a base frequency, an entropy, a kurtosis, a signal magnitude area (SMA) and/or a correlation coefficient of the data 114*c*. These features can be determined for each frequency band of the third transformed motion data 114*c* and/or, where the data is multiaxial, for one or more axes.

One or more of the fourth plurality of motion features 124 may measure how chaotic or non-repetitive an individual's activity is. This can allow the classification of exercise to be improved, where low degrees of chaos or non-repetitiveness can indicate exercise and high degrees of chaos or non-repetitiveness can indicate erratic or regular activity. For example, the kurtosis of an autocorrelation function of accelerometer and/or gyroscope data has been found to improve the accuracy of the model in identifying exercise, thus improving its ability to identify potential personal safety incidents. In one example, the fourth plurality of motion features can include a kurtosis of an autocorrelation function of an accelerometer's x-, y- and/or z-axis signal that has been filtered according to a low, medium, high and/or very high frequency band. The fourth plurality of motion features can additionally or alternatively include a kurtosis of an autocorrelation function of a gyroscope's x-, y- and/or z-axis signal that has been filtered according to a medium and/or high frequency band. In particular, the kurtosis of an autocorrelation function of a gyroscope's z-axis signal filtered according to a medium frequency band has been found to have a particularly large impact on the ability of the model 200 to identify exercise. In general, the lower the kurtosis value is, the more likely the activity is to be exercise. For example, a low kurtosis value may be indicative of exercise, while a higher kurtosis value may be indicative of regular or erratic activity. In one example, a kurtosis value of an autocorrelation function of a signal filtered according to a medium or high frequency band which is below around 6.0, preferably less than around 5.5, may be indicative of exercise. A kurtosis value of an autocorrelation function of a signal filtered according to a very high frequency band which is below around 13, preferably less than around 11, may be indicative of exercise.

Any of the motion features 124 and vital sign features 126 may have an asymmetrical impact on the determination made at step 130. For example, where the motion features 124 (e.g. the fourth plurality of motion features) include a kurtosis of an autocorrelation function of a gyroscope's signal, this statistic may have a greater impact on the classification of exercise than of regular or erratic activity. In other words, the lower the kurtosis value is, the more likely the model 200 is to classify the activity as exercise, but a higher value may only slightly (or not at all) increase the likelihood of classifying activity as regular or erratic.

Figure 4:
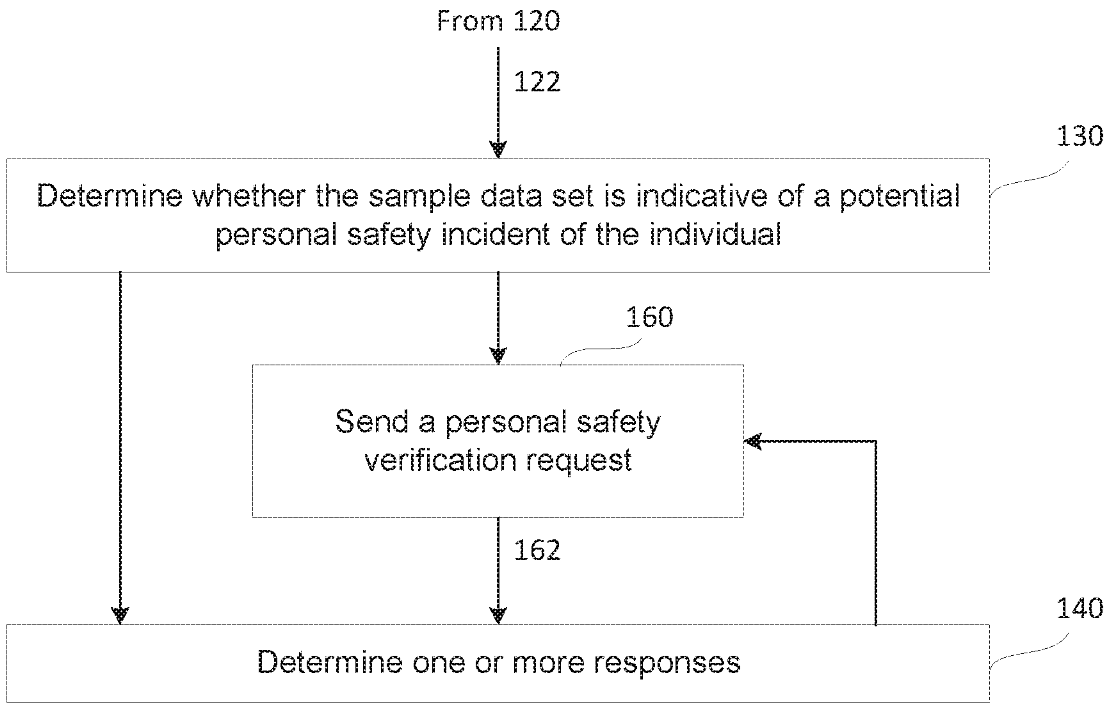
FIG. 4 shows a diagram of a method for identifying potential personal safety incidents.

Referring to FIG. 4, further steps that in some embodiments may form part of the method 100 will now be described. In particular, the method 100 may, after step 130, include the step of sending 160 a personal safety verification request to the individual 5. This may take the form of providing on a mobile user device of the individual 5, such as a smartphone 32, a notification, an application, or an interactive element requesting a personal safety verification from the individual 5. The request may take the form of a question checking whether the individual 5 is safe and requires a response from the individual 5. The request may be sent 160 in response to the determination 130 indicating that the sample data set 112 is indicative of a potential personal safety incident.

A response 162 received in response to the personal safety verification request indicative of the personal safety of the individual 5 is used, along with the determination 130, to determine 140 the one or more responses. If the response 162 indicates that the individual 5 is safe, then at step 140 the method may determine that no response is required, even if step 130 has determined that the sample data set 112 is indicative of a potential personal safety incident. In this way, the response 162 to the personal safety verification request can serve to override an automatic determination at step 130 if the individual 5 is in fact safe. The response 162 can thus be used to identify and suppress false positive determinations that a personal safety incident has occurred.

If the response 162 indicates that the individual 5 is not safe, or indeed if it indicates that the individual 5 has not responded to the personal safety verification request, the method 100 proceeds to determine 140 the one or more responses. The one or more responses may then be effected (not shown in FIG. 2*a*). For example, an alert signal may be transmitted to an emergency service or a device belonging to a friend of the individual 5, or directly to a mobile user device 30 of the individual 5 such as their smartphone 32 which can trigger an alarm, for example on an alarm device 50.

If, over a period of time after the response 162 is received, the method 100 continues to determine 130 that sample data sets 112 are indicative of potential personal safety incidents of the individual 5, one or more further personal safety verification requests may be sent. The method 100 may wait for a predetermined length of time after sending a request before sending a further request. For example, if a first personal safety verification request is sent to the individual 5 and a response 162 to that request indicates that the individual is safe but one or more subsequent sample data sets 112 are determined to be indicative of a potential personal safety incident, a further personal safety verification request can be sent around 10 seconds, 30 seconds or 1 minute after sending 160 the initial personal safety verification request. In some examples, the further personal safety verification request can be sent between around 1 second and 5 minutes or between around 5 seconds and around 2 minutes, preferably between around 10 seconds and 2 minutes, after sending 160 the initial personal safety verification request.

Figure 5A:
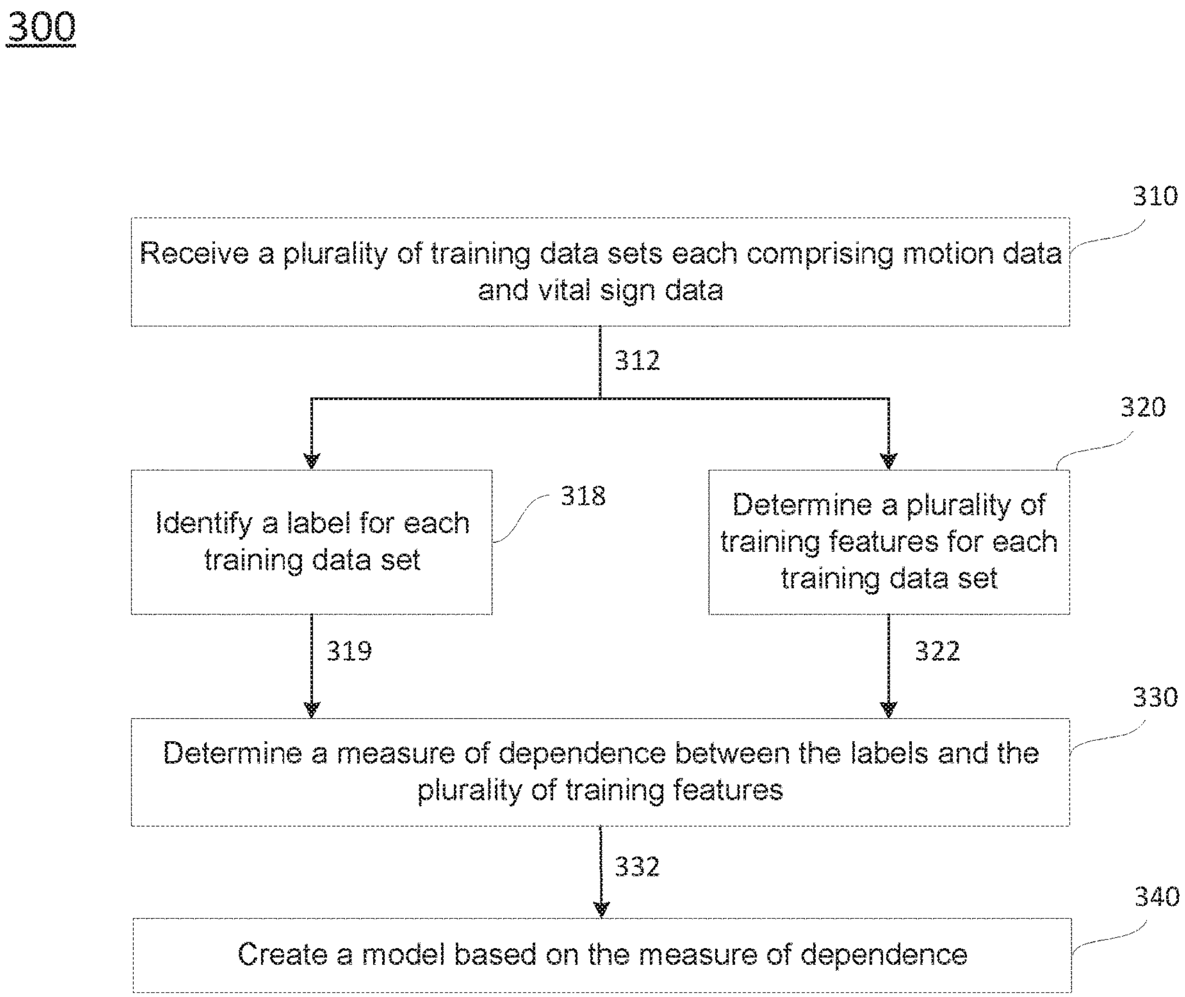
FIGS. 5*a* to 5*c* show (a) a diagram of a method for building a model (b) a diagram of a method for identifying a label and (c) a diagram of a labelling algorithm.

Referring to FIG. 5*a*, a method 300 for building a model 200 for relating one or more potential personal safety incidents of an individual 5 to features derivable from a data set comprising motion data and vital sign data will now be described. The method 300 begins by receiving 310 a plurality of training data sets 312, where each training data set 312 comprises motion data 314 and vital sign data 316. For each training data set 312, the motion data 314 is gathered using one or more motion sensors (such as motion sensors 14, 16 shown in FIG. 1) associated with an individual 5, and the vital sign data 316 is gathered using one or more vital sign sensors (such as vital sign sensor 18 shown in FIG. 1) associated with the individual 5. The individual 5 of each training data set 312 may be the same individual or may be different, and may be the same as or different from the individual 5 of the system 10. The motion data 314 and vital sign data 316 comprise time series data that are indicative of a series of values measured over a training time period. In some examples, the training time period has a duration of around 2 or 3 minutes. The motion data 314 may be of the same type as the motion data 114 of any example described herein, and the vital sign data 316 may be of the same type as the vital sign data 116 of any example described herein.

After step 310, at step 318, for each training data set 312, a label 319 is identified where the label 319 is indicative of whether a personal safety incident of the individual 5 occurred during the training time period. Each label 319 may be a binary value, or in some examples may be indicative of a category of personal safety incident. For example, the label 319 may indicate, such as through a vector of binary values, whether a certain event or type of response of the individual 5 associated with a personal safety incident has occurred. These may include the individual 5 struggling, being unconscious, feeling scared, feeling surprised, or feeling stressed.

The training data sets 312 may be manually labelled by a human operator to produce the labels 319, for example based on the human operator's expertise, or based on knowledge of one or more known occurrences of a personal safety incident of the individual 5 within each training time period. This can ensure that the labels 319 for the training data sets 312 are identified 318 accurately.

Figure 5B:
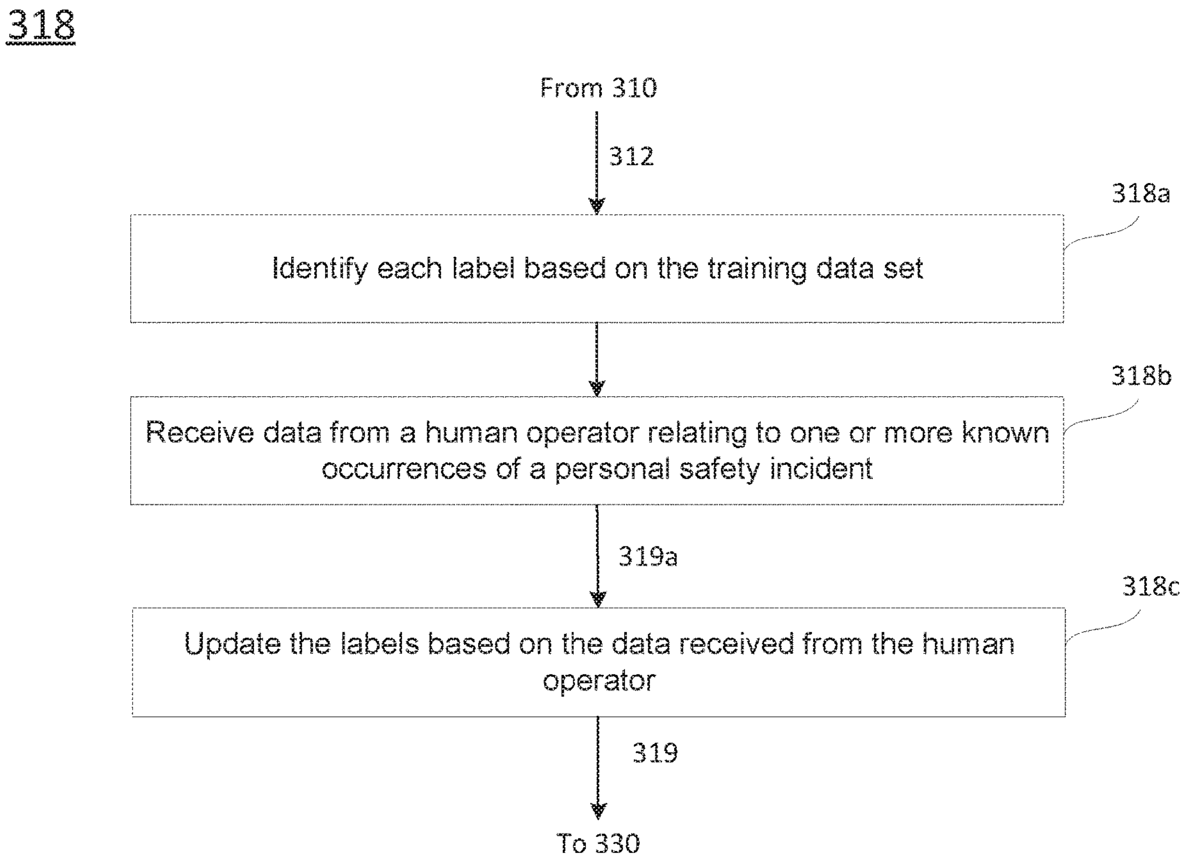

Alternatively, FIG. 5*b* shows an example method for identifying labels, which in some examples may be performed as part of step 318 of identifying 318 the label 319 for each training data set 312 shown in FIG. 5*a*. The method of FIG. 5*b* may first comprise the step 318*a* of identifying the label 319 based on the training data set 312. This identification 318*a* may be performed automatically without human input and is described in greater detail below. In some examples, the label 319 determined 318*a* based on the training data set 312 is then used as the label 319 for the training data set 312 in subsequent method steps.

Optionally and as shown in FIG. 5*b*, after determining 318*a* the label 319, data 319*a* is received 318*b* from a human operator. The data 319*a* relates to one or more known occurrences of a personal safety incident. The data 319*a* preferably comprises indications for each of the plurality of training data sets 312 of whether a personal safety incident of the individual 5 occurred during the training time period. Alternatively, the data 319*a* may comprise indications of whether a personal safety incident occurred during the training time period only for the training data sets 312 where one or more personal safety incidents are known to have occurred. The data 319*a* may be of the same format as the labels 319. The labels 319 are then updated 318*c* based on the data 319*a* received 318*b* from the human operator. For example, if a label 319 identified at step 318*a* based on the training data set 312 indicates that no personal safety incident occurred during the training time period but the data 319*a* received from the human operator indicates that a personal safety incident did in fact occur during that training time period, the label 319 for that training data set 312 is updated to indicate that a personal safety incident did occur during the training time period.

Figure 5C:
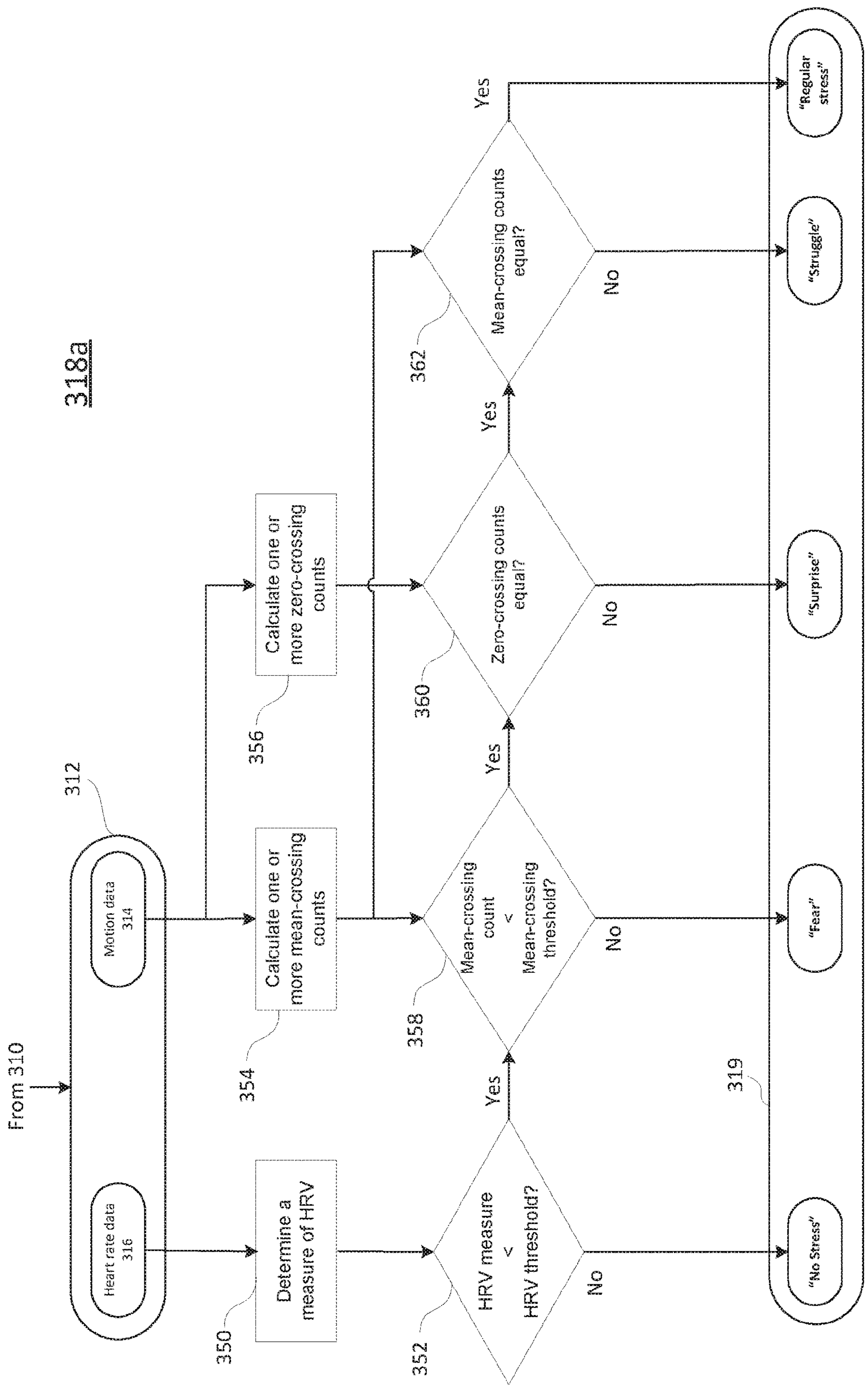

FIG. 5*c* shows a labelling algorithm which may in some examples be used in step 318*a* of identifying the labels 319 based on the training data sets 312. Identifying 318*a* the labels 319 based on the training data sets 312 is performed automatically, for example using a labelling algorithm configured to receive a training data set 312 and determine, based on the motion data 314 and the vital sign data 316, a label 319 indicative of whether a personal safety incident of the individual 5 has occurred.

Where the vital sign data 316 comprises heart rate data, a measure of heart rate variability (HRV) is determined 350 based on the heart rate data 316. This measure of HRV is then compared 352 to a HRV threshold, and the label 319 is determined based on the comparison 352 of the HRV measure to the HRV threshold. In some examples, the measure of HRV is a ratio of low-frequency HRV to a high-frequency HRV. The low-frequency HRV can be indicative of parasympathetic nervous system activity of the individual 5 corresponding to heart rate signal frequencies between around 0.1 Hz to 0.6 Hz, or between around 0.16 Hz and 0.6 Hz. The high-frequency HRV can be indicative of sympathetic nervous system activity of the individual 5 corresponding to heart rate signal frequencies above around 0.6 Hz, optionally below around 5 Hz. In this case, the measure of HRV will take a value between 0 and 1. Similarly, where the HRV measure is a ratio, the HRV threshold will be a value between 0 and 1, preferably between 0 and 0.2 or around 0.1. If the HRV measure is less than the HRV threshold, this indicates that the individual 5 was relaxed or experienced no stress during the training time period and this is indicated in the label 319. However, if the HRV measure is greater than the HRV threshold, this can indicate that the individual is experiencing some kind of stress, such as exhibiting a fight-or-flight response. In this case, motion data 314 is analysed to further determine the type of stress experienced by the individual 5 and thus the label 319.

For each axis of each sensor of the motion data 314, a mean-crossing count is calculated 354 where the mean-crossing count is indicative of the number of times the motion data 314 of that axis and sensor passes from above a mean value to below that mean value and vice versa during the training time period. Similarly, for each axis of each sensor of the motion data 314, a zero-crossing count is calculated 356 where the zero-crossing count is indicative of the number of times the motion data 314 of that axis and sensor changes sign during the training time period. The label 319 is identified based on one or more of the mean-crossing counts and/or one or more of the zero-crossing counts. The steps 354, 356 of calculating the mean-crossing counts may only be performed if the HRV measure is found to be less than the HRV threshold at step 352.

For example, as shown in FIG. 5*c*, one or more of the mean-crossing counts are compared 358 to a mean-crossing threshold, and the label 319 is identified based on the comparison 358. In some examples, all of the mean-crossing counts are compared 358 to a threshold, where the threshold is less than 2, preferably 1. If the comparison 358 finds that not all of the mean-crossing counts are less than the mean-crossing threshold or that one or more of the mean-crossing counts is greater than the mean-crossing threshold, this can indicate that the individual 5 experienced fear during the training time period and the label 319 is selected to indicate this. If the comparison 358 finds that all of the mean-crossing counts are less than the mean-crossing threshold, then the zero-crossing counts are compared 360.

In step 360, the zero-crossing counts of two or more axes of the motion data 314 are compared 360, and the label 319 is identified based on the comparison 360. In some examples, all of the zero-crossing counts are compared 360 with each other. If the comparison 360 finds that some or all of the zero-crossing counts are different, or optionally outside a predetermined range which is absolute or relative to the other zero-crossing counts (such as less than around ±5, or equal to around ±1 or ±2), this can indicate that the individual 5 experienced surprise during the training time period and the label 319 is selected to indicate this. If the comparison 360 finds that the zero-crossing counts are equal, then the mean-crossing counts are compared 362.

In step 362, the mean-crossing counts of two or more axes of the motion data 314 are compared 362, and the label 319 is identified based on the comparison 362. In some examples, all of the mean-crossing counts are compared 362 with each other. If the comparison 362 finds that some or all of the mean-crossing counts are different, or optionally outside a predetermined range which is absolute or relative to the other mean-crossing counts (such as less than around ±5, or equal to around ±1 or ±2), this can indicate that the individual 5 experienced a physical struggle during the training time period and the label 319 is selected to indicate this. If the comparison 362 finds that the mean-crossing counts are equal, then this can indicate that the individual 5 experienced regular stress or stress that was intentional, for example from exercise. The label 319 can be selected to indicate this.

Referring again to FIG. 5*a*, after receiving 310 the plurality of training data sets 312, a plurality of training features 322 is determined 320 for each training data set 312. This determination 320 is performed based on the motion data 314 and the vital sign data 316 in the training data set 312. In some examples, the training features 322 comprise motion features 324 and vital sign features 326. The step 320 of determining the training features 322 may be performed using any of the methods already described herein for determining sample features, such as those shown in FIG. 2*b* and described in the accompanying passages of the description.

The method 300 then proceeds to the step 330 of determining a measure of dependence 332 between the labels 319 of the training data sets 312 and the corresponding plurality of training features 322. In some examples, the measure of dependence 332 comprises a plurality of weights and determining 330 the measure of dependence 332 comprises learning the values of the weights. The weights are learned such that, when they are applied to a training data set 312 according to an architecture, an output is obtained and an error between this output and the label 319 corresponding to the training data set 312 is minimised. In some examples, the weights are those of a neural network such as a recurrent neural network and they are learned by executing an error minimisation algorithm for errors between the neural network's outputs and the labels 319 of the training data sets 312.

At step 340, a model 200 is then created based on the determined measure of dependence 332. The model 200 is configured to receive as input features derivable from a data set comprising motion data and vital sign data and is configured to relate a potential personal safety incident of an individual to those features. The model 200 may be the same type and/or may be configured to receive the same inputs and provide the same outputs as the model 200 described above.

Any of the methods 100, 300 described herein may be performed on one or more processors located at one or more remote servers 40. This can improve the energy efficiency of performing the methods by reducing usage of batteries of the mobile user devices 30 and can also improve data security since server computing architectures are typically much more secure than mobile user devices. This may also allow a record of events and situations to be made that is independent of devices worn or carried by the user; this may allow investigations to be performed in case such devices are lost or damaged (e.g. in the case of an attack or other safety incident). In these examples, training data sets and/or sample data sets comprising data gathered by sensors 12 provided on one or more mobile user devices 30 are received 110, 310 at a server 40.

Figure 6A:
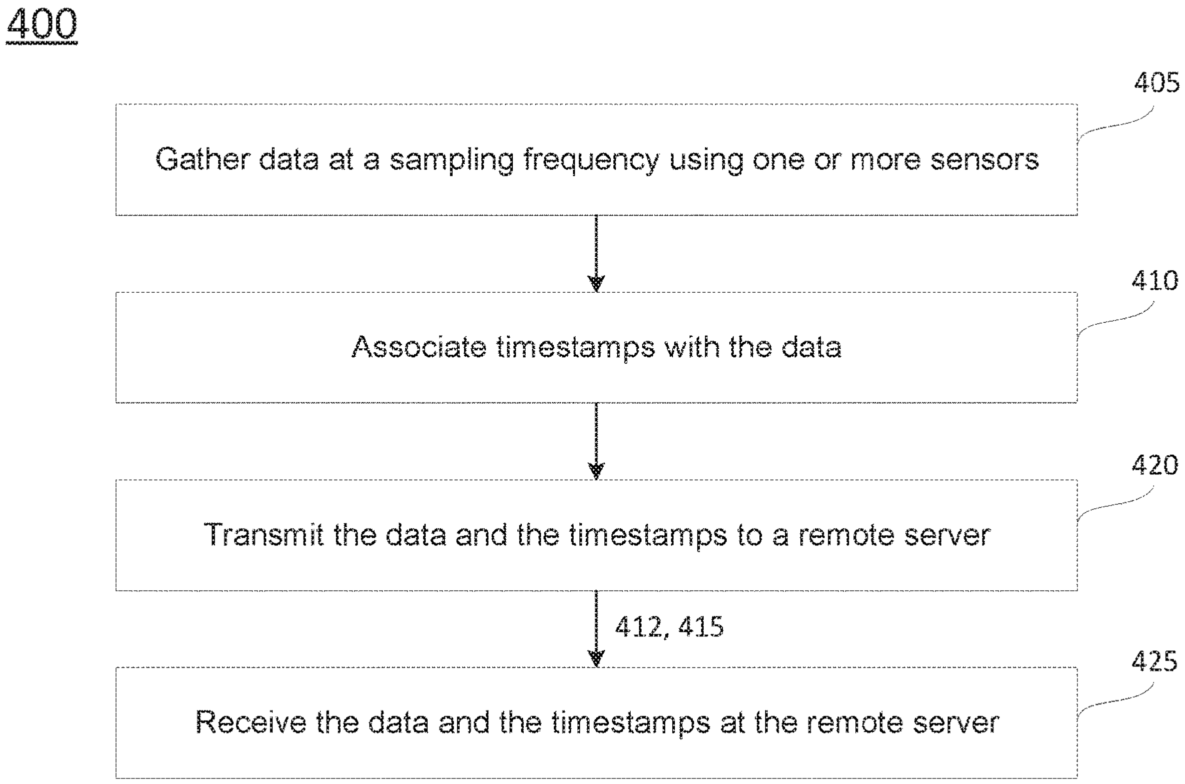
FIGS. 6*a* to 6*c* show (a) a diagram of an example method for transmitting data to a remote server, (b) a diagram of another example method for transmitting data to a remote server and (c) a diagram of a method for receiving data packets at a remote server.

Referring to FIG. 6*a*, a method 400 for transmitting data 412 to a remote server 40 will now be described. In some examples, the steps 110, 310 of methods 100, 300 comprise the method 400, wherein the data 412 being transmitted form at least part of the sample data sets 112 and training data sets 312 respectively. The method 400 begins with gathering 405 data 412 at a sampling frequency using one or more sensors 12, where the data 412 is to be transmitted to a remoted server 40. The data 412 comprises motion data and vital sign data, and forms at least part of a data set to be received at the remote server 40. The motion data and vital sign data comprise time series data, such that the motion data and the vital sign data comprise data points corresponding to different points in time. The motion data can comprise different types of motion data, such as acceleration data and gyroscope data, and each type can be multiaxial, preferably triaxial. The vital sign data can comprise different types of vital sign data, such as heart rate data, blood pressure data, sweat data, temperature data and/or blood oxygen saturation data. The sensors 12 may be provided on one or more mobile user devices 30. The sampling frequency can be between around 3 Hz and around 100 Hz or between around 4 Hz and around 50 Hz. In preferred embodiments, the sampling frequency can be at least around 5 Hz or can be more than around 25 Hz or 50 Hz. In some examples, the sampling frequency for the vital sign data may be different from the sampling frequency for the motion data. Gathering the motion data and vital sign data can include storing those data at least temporarily in one or more memories provided on the one or more mobile user devices 30.

A timestamp 415 is associated 410 with each data point of the data 412, the timestamp 415 indicating a point in time when the associated data point was gathered 405. Associating 410 timestamps 415 with the gathered data 412 can also include storing the timestamps 415 in the one or more memories of the mobile user devices 30. The gathered data 412 and the corresponding timestamps 415 are transmitted 420 to the server 40, for example via the internet or any type of wireless communications network. The remote server 40 can be a cloud computing server. The gathered data 412 and the timestamps 415 are then received 425 at the remote server 40. By receiving the timestamps 415 associated with the data 412, the sampling frequency can be determined at the server 40, regardless of any delay introduced during transmission of the data 412. This also allows one or more data sets to be formed from the data 412 at the server 40, where the data sets are associated with data 412 gathered over a period of time. This means that data sets corresponding to a consistent period of sampling time, such as around 2 or 3 minutes, can be formed without the need to account for delay at the server 40.

Figure 6B:
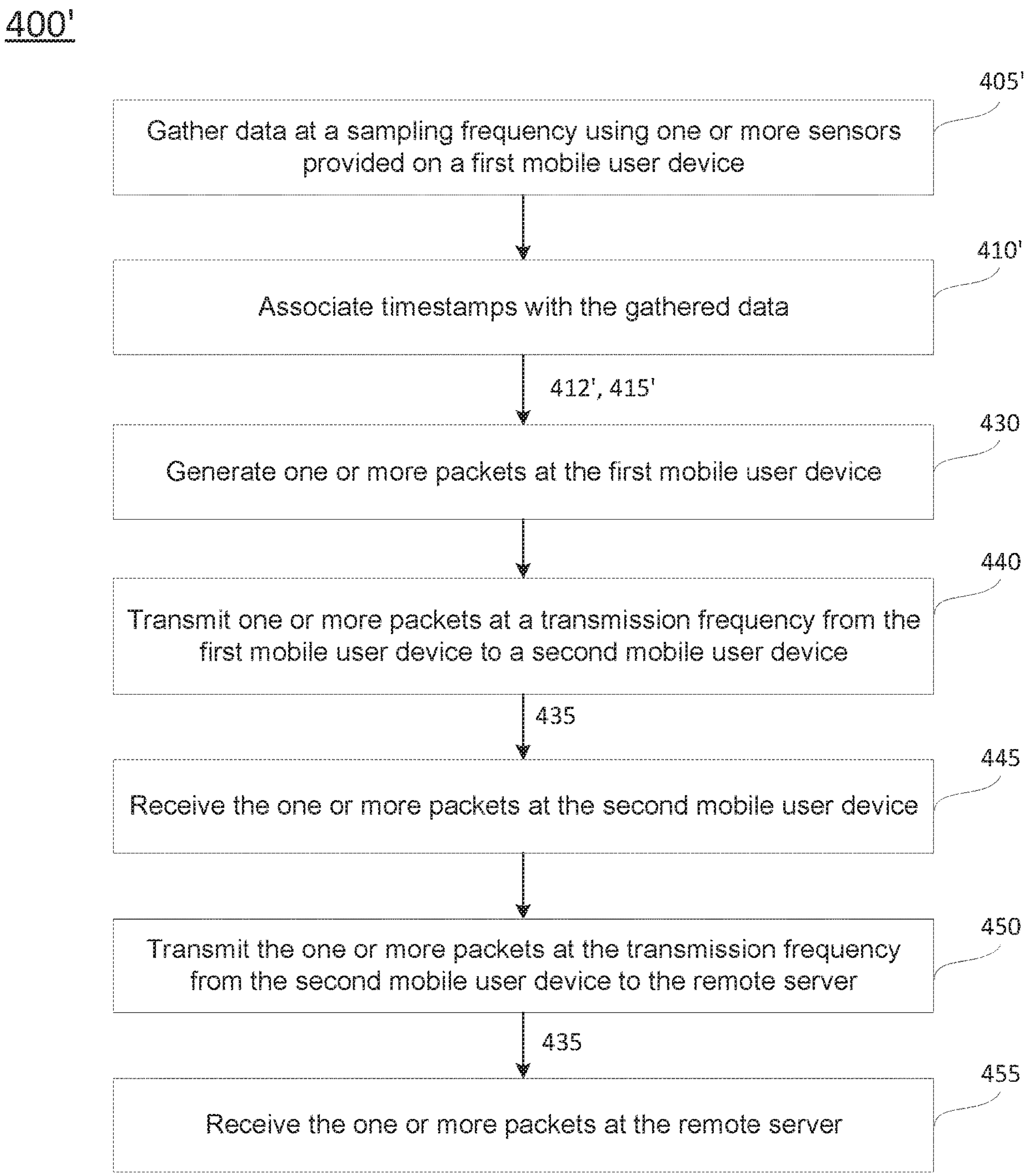

FIG. 6*b* shows an alternative method 400' to the method 400 shown in FIG. 6*a*. Referring to FIG. 6*b*, in some examples the data 412' are gathered 405' by sensors 12 provided on a first mobile user device 34, such as a smart watch, at the sampling frequency. After associating 410' timestamps 415' with the gathered data 412', one or more packets 435 are generated 430 at the first mobile user device 34. The packets 435 comprise at least a portion of the gathered data 412' and their associated timestamps 415'. Each packet 435 may contain one or more types or axes of motion data and/or one or more types of vital sign data.

The packets 435 are then transmitted 440 at a first transmission frequency from the first mobile user device 34 to a second mobile user device 32, such as a smartphone. The transmission 440 of packets 435 to the second mobile user device 32 is preferably performed wirelessly using a wireless communication protocol, such as Bluetooth®, Bluetooth® Low Energy, near-field communication (NFC), radio-frequency identification (RFID) or Zigbee®. The packets 435 are received 445 at the second mobile user device 32, before being transmitted 450 at a second transmission frequency from the second mobile user device 32 to the remote server 40. The transmission 450 of packets 435 to the remote server 40 is preferably performed wirelessly using a wireless communication protocol, such as Wi-Fi®, 3G, 4G or 5G. The packets 435 are then received 455 at the remote server 40. The data 412' and timestamps 415' can then be stored in a memory at the remote server 40 to be processed. A data set may comprise data 412' received via one or more packets 435.

In some examples, the first and second transmission frequencies are less than or equal to the sampling frequency. Where the first transmission frequency is less than the sampling frequency, the amount of power used by the first mobile user device 34 for transmitting data 412' gathered at a given sampling frequency can be lower due to the decreased transmission frequency. Similarly, where the second transmission frequency is less than the sampling frequency, the amount of power used by the second mobile user device 32 for transmitting data 412' can also be lower. Each packet 435 is generated 430 independently from previously generated packets, which allows for efficient recovery of lost packets in case a connection is lost between the first mobile user device 34 and the second mobile user device 32 and/or the second mobile user device 32 and the server 40, as only those packets which failed to send during a period of lost connection need to be transmitted again.

In some examples, each packet 435 contains motion data and/or vital sign data corresponding to at least around 10 points in time. In this case, the first and/or second transmission frequency is around 10 times lower than the sampling frequency. Each packet 435 is configured to contain around 100 data points and their associated timestamps 415'. Where the sampling frequency is around 5 Hz, each packet 435 contains data 412' corresponding to a time period of at least around 2 seconds. In this case, the first and/or second transmission frequency may be around 0.5 Hz.

In some examples, the first and second transmission frequencies may be different. For example, the first transmission frequency may be greater than the second transmission frequency. Accordingly, the packets 435 sent from the first mobile user device 34 may contain motion data and/or vital sign data corresponding to fewer points in time than packets 435 sent from the second mobile user device 32 to the remote server 40. This can ensure an approximately constant flow of data from the first mobile user device 34 to the server 40. In some examples, one or more packets 435 received from the first mobile user device 34 at the second mobile user device 32 may grouped into larger packets 435 to be sent to the remote server 40. For example, the first transmission frequency may be between around 1 Hz and around 10 Hz, preferably equal to around 5 Hz, and the data packets 435 sent from the first mobile user device 34 may each contain around 17 data points, for example around 8 data points corresponding to each type of motion data and 1 data point corresponding to vital sign data. In this case, the second transmission frequency may be between around 2 times and 5 times smaller than the first transmission frequency, such as between around 0.1 Hz and around 5 Hz, preferably equal to around 2.5 Hz.

Figure 6C:
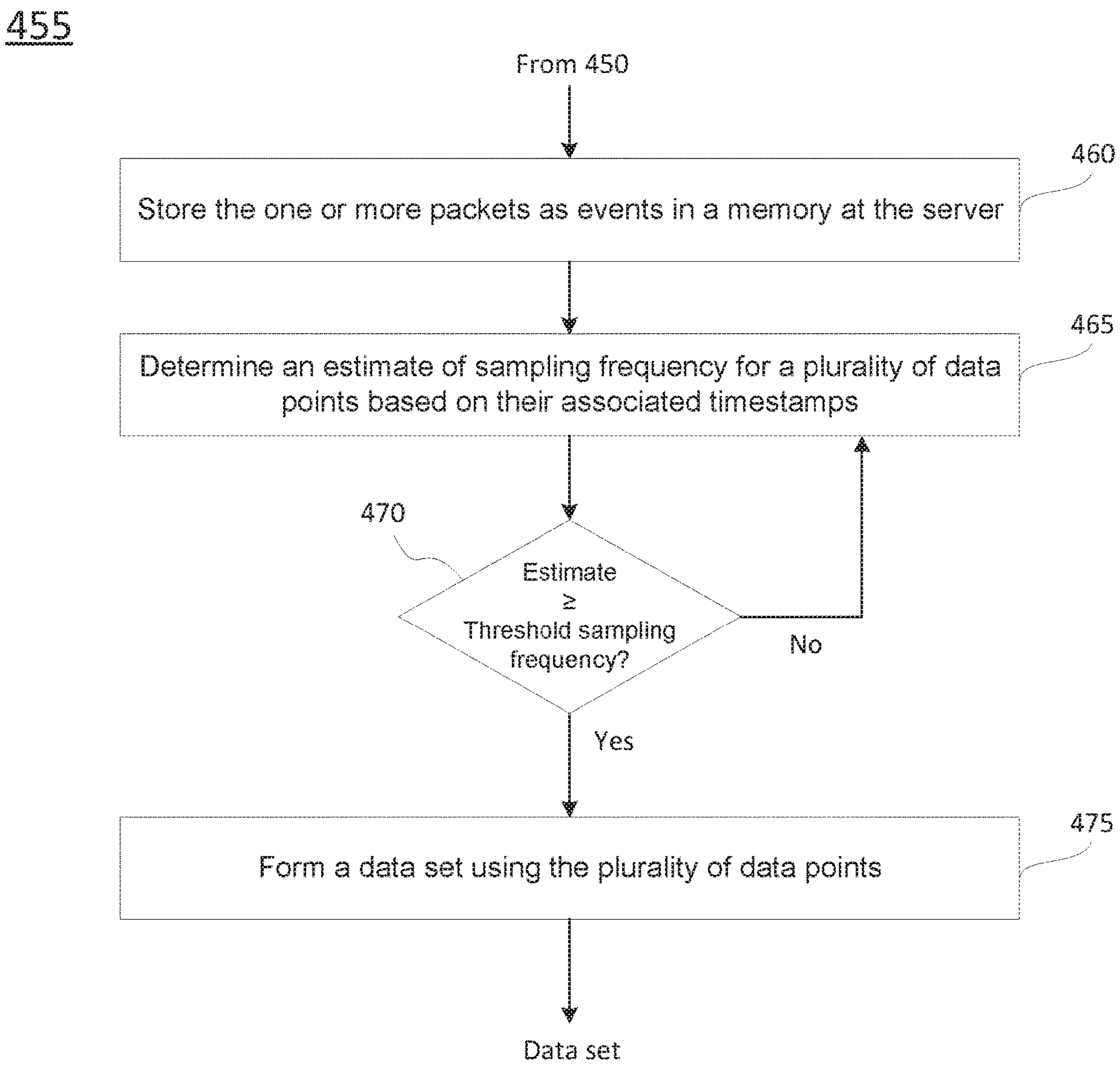

Referring to FIG. 6*c*, an example method that may be performed as part of step 455 in FIG. 6*b* of receiving the one or more packets 435 at the remote server 40 according to some examples will now be described. The packets 435 are stored 460 as events in a memory at the server 40. Applications and functions operating at the server can subscribe to one or more of the events in order to receive the data 412' contained in the packets 435 corresponding to those events. Storing packets 435 as events in this way is asynchronous, meaning that if a connection drops such that the receipt of packets 435 at the server 40 is interrupted, the server 40 can still receive and process data 412' sent during the interruption once the connection resumes. This means the server 40 is well-suited to process data on the fly, for example to make real-time predictions such as determining potential personal safety incidents. Storing packets 435 as events at the server 40 can allow different applications or functions at the server 40 to run as quickly as possible and for the same amount of time regardless of the size of each data packet 435, since they only need to run once for each type of data in each packet 435.

In some examples, one or more applications or functions at the server 40 can form 475 a data set based on data 412' contained in one or more packets 435. An estimate of sampling frequency is determined 465 for a plurality of data points of the data 412' based on their associated timestamps 415'. In some examples, this comprises determining 465 an estimated average sampling frequency across the plurality of data points based on their associated timestamps. Alternatively or additionally, an estimated sampling frequency is determined 465 for each data point based on its associated timestamp 415', and on the timestamp 415' of a preceding data point and/or the time stamp 415' of a subsequent data point. The estimated average sampling frequency may be an average of the estimated sampling frequencies determined for each data point.

The estimate of sampling frequency is then compared 470 to a threshold sampling frequency. If the estimated average sampling frequency and/or each estimated sampling frequency is greater than or equal to a threshold sampling frequency, a data set is formed 475 using the plurality of data points. If the estimated average sampling frequency and/or one or more of the estimated sampling frequencies are less than the threshold sampling frequency, the method 400 returns to step 465 to determine an estimate of sampling frequency for another plurality of data points. The threshold sampling frequency is at least around 5 Hz or 6 Hz. There may be a different threshold sampling frequency for motion data and vital sign data. Where the method 400 is used with methods 100, 300, this can ensure that the sampling rate of the data being processed is greater than the maximum frequency being analysed from the data. For example, if motion data up to around 5 Hz is of interest, for instance if higher frequencies correspond to noise rather than movements of an individual, then ensuring the sampling frequency of the data is greater than 5 Hz allows the discrete series of data points to fully represent the motion being measure, and for example allows accurate Fourier analysis of the data to be performed. When used with the methods 100, 300, this can also improve the accuracy of the determination of whether sample data sets 112 indicate a potential personal safety incident and of the automatic labelling of sample data sets 312 respectively. Additionally or alternatively, data corresponding to frequencies above the threshold sampling frequency can be filtered out, for example if such data corresponds to noise. This can allow data with any sampling frequency equal to or greater than the threshold sampling frequency to be used without having to adjust parameters for subsequent data processing steps, such as filters used for filtering motion data into a plurality of frequency bands.

Each formed data set can comprise data 412' from a plurality of packets 435, such as 10 or more packets 435, preferably at least around 60 packets. Each formed data set comprises gathered data 412' corresponding to a real-time period of at least around 2 minutes. The formed data sets can be used as sample data sets 112 for the method 100 or as training data sets 312 for the method 300.

Figure 7A:
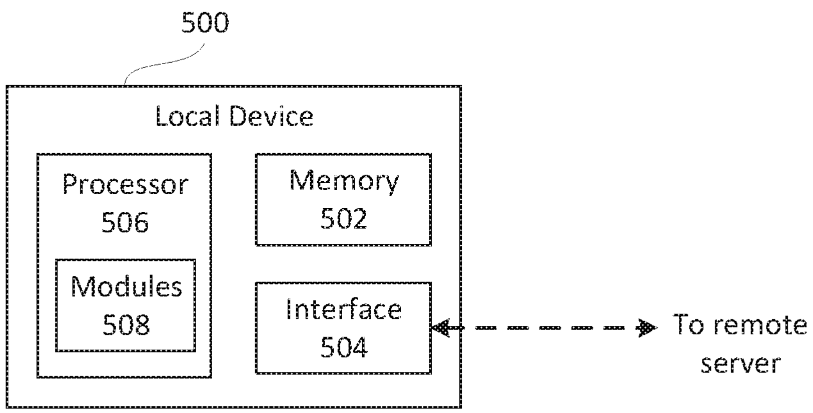
FIGS. 7*a* and 7*b* show diagrams of (a) a local device and (b) a remote server.

Referring to FIG. 7*a*, a local device 500 for identifying potential personal safety incidents of an individual will now be described. In some examples, the local device 500 may be a mobile user device, such as mobile user device 30 or smartphone 32. The local device 500 has a memory 502, a communications interface 504 and a processor 506 providing processing modules 508. The communications interface 504 can enable the local device 500 to send and receive data from other devices, such as another local device and/or a remote device. For example, the local device 500 may receive sensor data from one or more sensor devices, such as separate motion and vital sign sensor devices, or a combined sensor device (for example a smart watch that comprises both motion and vital sign sensors). In some embodiments the local device may comprise one or more integrated motion and/or vital sign sensors. Further, as shown in FIG. 7*a*, in preferred embodiments the local device 500 is capable of communication with a remote server (such as remote server 40) via the communications interface 504. In some examples, one or more of the modules 508 are configured to execute jointly or individually instructions stored in the memory 502, causing the local device 500 to perform at least some of the steps of methods 100, 200, 300, 400, 400'. For example, the local device 500 may perform a portion of the data processing for performing the steps of a method, and one or more other devices, such as a remote server in communication with the local device 500 via the communications interface 504, may perform at least part of the remaining portion of the data processing.

Figure 7B:
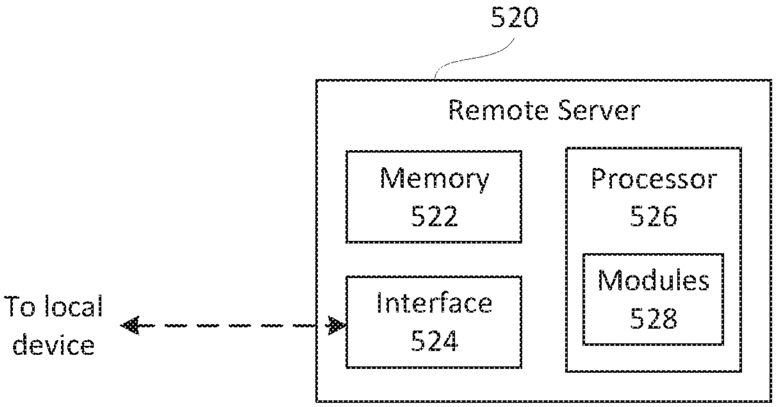

Referring to FIG. 7*b*, a remote server 520 for identifying potential personal safety incidents of an individual will now be described. In some examples, the remote server 520 may be the remote server 40 as described above. The remote server 520 has a memory 522, a communications interface 524 and a processor 526 providing processing modules 528. The communications interface 524 can enable the remote server 520 to receive data from other devices, such as local devices and/or another remote server. For example, as shown in FIG. 7*b*, the remote server 520 is capable of communication with a local device (such as local device 500, mobile user device 30 or smartphone 32) via the communications interface 524. In some examples, one or more of the modules 528 are configured to execute jointly or individually instructions stored in the memory 522, causing the remote server 520 to perform at least some of the steps of methods 100, 200, 300, 400, 400'. For example, the remote server 520 may perform a portion of the data processing for performing the steps of a method, and one or more other devices, such as a local device in communication with the remote server 520 via the communications interface 524, may perform at least part of the remaining portion of the data processing. Alternatively, the remote server 520 may perform all of the data processing required for a method 100, 200, 300, 400, 400', and one or more other devices, such as a local device in communication with the remote server 520 via the communications interface 524, may transmit data to the remote server 520 via the communications interface 524.

While specific methods, systems and devices are shown, any appropriate hardware/software architecture may be employed. For example, data transmission may be partially via a wired network connection, and the sensors may be provided on a variety of wearable monitoring devices.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

Aspects of the apparatus and methods described herein are further exemplified in the following numbered CLAUSES:

1. A method for identifying potential personal safety incidents of an individual, the method comprising the steps of: receiving a sample data set comprising motion data from one or more motion sensors associated with the individual and vital sign data from one or more vital sign sensors associated with the individual; determining a plurality of sample features based on the motion data and the vital sign data, the plurality of sample features comprising one or more motion features and one or more vital sign features; determining whether the sample data set is indicative of a potential personal safety incident of the individual based on a model and on at least one of the one or more motion features and at least one of the one or more vital sign features, the model configured to relate features derivable from motion data and vital sign data to potential personal safety incidents; and outputting the determination of whether the sample data set is indicative of a potential personal safety incident.
2. The method according to clause 1, wherein the motion data is received from at least a first motion sensor and a second motion sensor associated with the individual; wherein determining the one or more motion features comprises determining a first motion feature from the motion data from the first motion sensor and determining a second motion feature from the motion data from the second motion sensor; and wherein determining whether the sample data set is indicative of a potential personal safety incident is based on both the first motion feature and the second motion feature.
3. The method according to clause 1 or 2, wherein determining the plurality of sample features comprises the step of filtering at least a portion of the sample data set, preferably filtering based on frequency.
4. The method according to clause 3, wherein determining the plurality of sample features comprises the step of filtering the motion data based on a plurality of frequency bands.
5. The method according to clause 3 or 4, wherein determining the plurality of sample features further comprises the step of determining one or more, preferably at least 3, more preferably at least 10, motion features based on the filtered motion data.
6. The method according to any preceding clause, wherein determining the plurality of sample features comprises the step of transforming the motion data into a frequency domain to produce first transformed motion data.
7. The method according to clause 4 or any clause dependent thereon, wherein determining the plurality of sample features further comprises the step of, after filtering the motion data, for each of one or more of the frequency bands, transforming the filtered motion data into a frequency domain to produce first transformed motion data.
8. The method according to clause 6 or 7, wherein determining the plurality of sample features further comprises the step of determining one or more, preferably at least 3, more preferably at least 10, motion features based on the first transformed motion data.
9. The method according to any preceding clause, wherein determining the plurality of sample features comprises the step of transforming the motion data into a time-frequency domain to produce second transformed motion data.
10. The method according to clause 4 or any clause dependent thereon, wherein determining the plurality of sample features further comprises the step of, after filtering the motion data, for each of one or more of the frequency bands, transforming the filtered motion data into a time-frequency domain to produce second transformed motion data.
11. The method according to clause 9 or 10, wherein determining the plurality of sample features further comprises the step of determining one or more, preferably at least 3, more preferably at least 10, motion features based on the second transformed motion data.
12. The method according to clause 4 or any clause dependent thereon, wherein the plurality of frequency bands comprises: a first band corresponding to low frequencies, preferably having an upper threshold between around 0.3 Hz and 1.5 Hz or between around 0.4 Hz and 1.2 Hz, more preferably having an upper threshold of around 0.5 Hz or around 1 Hz; a second band corresponding to high frequencies, preferably having a lower threshold approximately equal to an upper threshold of the first band and having an upper threshold between around 1.5 Hz and around 4 Hz or between around 1.7 Hz and around 3.5 Hz, more preferably having an upper threshold of around 2 Hz or around 3 Hz; and a third band corresponding to very high frequencies, preferably having a lower threshold approximately equal to an upper threshold of the second band.
13. The method according to clause 5 or any clause dependent thereon, wherein determining one or more motion features based on the filtered motion data comprises the step of determining, for each of one or more of the frequency bands, one or more sample motion features based on the filtered motion data within that frequency band.
14. The method according to any preceding clause, wherein the one or more motion features comprise at least one of: a range; an average; a variance; a mean-crossing count; a zero-crossing count; and a base frequency.
15. The method according to any preceding clause, wherein the one or more vital sign features comprise at least one of: a range of the vital sign data; an average of the vital sign data; and a variability of the vital sign data.

16 The method according to any preceding clause, wherein the one or more vital sign features comprise a variability of the vital sign data and wherein the variability of the vital sign data comprises a ratio of a low-frequency heart rate variability to a high-frequency heart rate variability, preferably wherein the low-frequency heart rate variability corresponds to heart rate signal frequencies below a threshold frequency and the high-frequency heart rate variability corresponds to heart rate signal frequencies above the threshold frequency.

17. The method according to clause 16, wherein the threshold frequency is between around 0.2 Hz and around 1 Hz or between around 0.4 Hz and around 0.8 Hz, preferably equal to around 0.6 Hz; optionally wherein the low-frequency heart rate variability corresponds to heart rate signal frequencies having a lower threshold between around 0 Hz and around 0.3 Hz or between around 0.1 Hz and around 0.2 Hz, preferably around 0.16 Hz; and optionally wherein the high-frequency heart rate variability corresponds to heart rate signal frequencies having an upper threshold between around 3 Hz and around 7 Hz or between around 4 Hz and around 6 Hz, preferably around 5 Hz.

18. The method according to any preceding clause, wherein the motion data comprises acceleration data.

19. The method according to any preceding clause, wherein the motion data comprises gyroscope data.

20. The method according to any preceding clause, wherein the vital sign data comprises heart rate data.

21. The method according to any preceding clause, wherein the motion data comprise multiaxial data corresponding to 2 or more axes, preferably 3 axes.

22. The method according to clause 21, wherein the motion features comprise at least one motion feature for each axis of the motion data.

23. The method according to any preceding clause, further comprising the step of determining one or more responses based on the determination of whether the sample data set is indicative of a potential personal safety incident.

24. The method according to any preceding clause, further comprising the step of assigning one or more probabilities associated with the determination of whether the sample data set is indicative of a potential personal safety incident based on the model and the plurality of sample features.

25. The method according to clause 24 as dependent on clause 23, wherein determining the one or more responses is further based on the one or more probabilities.

26. The method according to any preceding clause, wherein the model is a recurrent neural network configured to receive as input the plurality of sample features and provide as output a determination of whether the sample data set is indicative of a potential personal safety incident.

27. The method according to any preceding clause, wherein the potential personal safety incident comprises at least one of: the individual experiencing fear; the individual experiencing surprise; and the individual struggling.

28. The method according to any preceding clause, wherein the model is configured to: determine a level of stress of the individual indicated by the motion data; determine a level of stress of the individual indicated by the vital sign data; and determine whether the sample data set is indicative of a potential personal safety incident of the individual based on a difference between the level of stress indicated by the motion data and by the vital sign data.

29. The method according to clause 23 or any clause dependent thereon, further comprising the steps of: sending to the individual a personal safety verification request; and monitoring for a user input via a user interface, the user input being in response to the request; wherein determining the one or more responses is further based on the outcome of monitoring for the user input.

30. The method according to any preceding clause, wherein the one or more motion sensors are configured to measure at least one of an acceleration and an orientation; and/or wherein the one or more vital sign sensors are configured to measure at least one of a pulse, a heart rate variability, a blood pressure, a sweat property, a temperature, a breathing rate, an adrenaline level and a blood oxygen saturation level.

31. The method according to clause 23 or any clause dependent thereon, wherein the one or more determined responses comprise triggering an alarm.

32. The method according to clause 31, wherein the alarm is triggered on an alarm device configured, in response to the alarm being triggered, to emit a high-volume sound, preferably between around 100 dB and around 300 dB or between around 120 dB and around 200 dB, more preferably between around 130 dB and around 180 dB.

33. The method according to clause 23 or any clause dependent thereon, wherein the one or more determined responses comprise signalling an alert to a third party, preferably wherein the third party is an emergency service or a second individual located nearby to the individual.

34. The method according to any preceding clause, wherein the motion data and/or the vital sign data are time series data.

35. The method according to any preceding clause, wherein the sample data set comprises one or more timestamps each indicative of a time when the motion data were captured by the one or more motion sensors and/or when the vital sign data were captured by the one or more vital sign sensors.

36. The method according to any preceding clause, further comprising the step of determining a sampling frequency associated with the sample data set, wherein the plurality of sample features is determined if the sampling frequency is above a sampling frequency threshold, preferably at least around 5 Hz.

37. The method according to clause 36 as dependent on clause 35, wherein the sampling frequency is determined based on the one or more timestamps.

38. A method for identifying potential personal safety incidents of an individual, the method comprising the steps of: receiving a packet comprising a plurality of sample data sets; and for one or more of the sample data sets, performing the method according to any preceding clause.

39. The method according to clause 38, wherein each packet comprises motion data and vital sign data corresponding to at least around 10 points in time.

40. The method according to clause 38 or 39, wherein each packet comprises motion data and vital sign data corresponding to a time period of at least around 2 seconds.

41. A method of training a model for relating one or more potential personal safety incidents of an individual to features derivable from a data set comprising motion data and vital sign data, the method comprising: receiving a plurality of training data sets, each training set comprising motion data from one or more motion sensors associated with an individual over a training time period and vital sign data from one or more vital sign sensors associated with the individual over the training time period; receiving for each training data set a label indicative of whether conditions corresponding to a personal safety incident of the individual occurred during the training time period; determining for each training data set a plurality of training features based on the motion data and the vital sign data, the plurality of training features comprising one or more motion features and one or more vital sign features; determining a measure of dependence between the labels and at least one of the one or more motion features and at least one of the one or more vital sign features; and creating a model based on the determined measure of dependence, wherein the model is configured to relate a potential personal safety incident of an individual to features derivable from a data set comprising motion data and vital sign data.

42 The method according to clause 41, further comprising identifying a label for each training data set by identifying the label based on the training data set; and optionally further comprising: receiving data from a human operator relating to one or more known occurrences of conditions corresponding to a personal safety incident of the individual during the training time period; and updating the label based on the data received from the human operator.

43. The method according to clause 42, wherein the vital sign data comprises heart rate data, and wherein, for each training data set, identifying the label based on the training data set comprises the steps of: determining a measure of heart rate variability based on the heart rate data; comparing the measure of heart rate variability to a heart rate variability threshold; and identifying the label based on the comparison of the measure of heart rate variability to the heart rate variability threshold.

44. The method according to clause 43, wherein the measure of heart rate variability is a ratio of a low-frequency heart rate variability to a high-frequency heart rate variability, preferably wherein the low-frequency heart rate variability corresponds to heart rate signal frequencies below a threshold frequency and the high-frequency heart rate variability corresponds to heart rate signal frequencies above the threshold frequency, preferably wherein: the threshold frequency is between around 0.2 Hz and around 1 Hz or between around 0.4 Hz and around 0.8 Hz, preferably equal to around 0.6 Hz; optionally wherein the low-frequency heart rate variability corresponds to heart rate signal frequencies having a lower threshold between around 0 Hz and around 0.3 Hz or between around 0.1 Hz and around 0.2 Hz, preferably around 0.16 Hz; and optionally wherein the high-frequency heart rate variability corresponds to heart rate signal frequencies having an upper threshold between around 3 Hz and around 7 Hz or between around 4 Hz and around 6 Hz, preferably around 5 Hz; preferably wherein the heart rate variability threshold is between 0 and around 0.2, preferably around 0.1.

45. The method according to clause 43 or 44, wherein the motion data comprise multiaxial data corresponding to 2 or more axes, and wherein, for each training data set, if the measure of heart rate variability is less than the heart rate variability threshold, identifying the label based on the comparison of the measure of heart rate variability to the heart rate variability threshold comprises the steps of: for each axis of the motion data, calculating a mean-crossing count indicative of the number of times the motion data passes from above a mean value to below that mean value and/or vice versa during the training time period; and/or for each axis of the motion data, calculating a zero-crossing count indicative of the number of times the motion data changes sign during the training time period; and identifying the label based on one or more of the mean-crossing counts and/or one or more of the zero-crossing counts.

46. The method according to clause 45, wherein, for each training data set, identifying the label based on one or more of the mean-crossing counts comprises the steps of: comparing one or more of the mean-crossing counts to a mean-crossing threshold, preferably wherein the mean-crossing threshold is less than 2, more preferably equal to 1; and identifying the label based on the comparison with the mean-crossing threshold.

47 The method according to clause 46, wherein, for each training data set, identifying the label based on the comparison with the mean-crossing threshold comprises the step of identifying the label if one or more of the mean-crossing counts are greater than the mean-crossing threshold, preferably wherein the label indicates that the individual experienced fear during the training time period.

48. The method according to clause 45 or any clause dependent thereon, wherein, for each training data set, identifying the label based on one or more of the zero-crossing counts comprises the steps of: comparing the zero-crossing counts of two or more axes of the motion data; and identifying the label based on the comparison between zero-crossing counts.

49. The method according to clause 48, wherein, for each training data set, identifying the label based on the comparison between zero-crossing counts comprises the step of identifying the label if one or more of the compared zero-crossing counts are different, preferably wherein the label indicates that the individual experienced surprise during the training time period.

50. The method according to clause 45 or any clause dependent thereon, wherein, for each training data set, identifying the label based on one or more of the mean-crossing counts comprises the steps of: comparing the mean-crossing counts of two or more axes of the motion data; and identifying the label based on the comparison between mean-crossing counts.

51. The method according to clause 50, wherein, for each training data set, identifying the label based on the comparison between mean-crossing counts comprises the step of identifying the label if one or more of the compared mean-crossing counts are different, preferably wherein the label indicates that the individual struggled during the training time period.

52. The method according to any of clauses 41 to 51, wherein, for each training data set, the training time period is at least around 1 minute, preferably at least around 2 minutes, more preferably at least around 5 minutes.

53. The method according to any of clauses 1 to 40 wherein the received model is built according to the method of any of clauses 41 to 52.

54. A computer-readable storage medium comprising instructions which, when executed on a processor, cause the processor to perform the method of any preceding clause.

55. A mobile device comprising: a processor; a communications interface configured to receive data from one or more motion sensors and one or more vital sign sensors; and a memory comprising instructions which, when executed by the processor, cause the mobile device to perform the method of any of clauses 1 to 53.

56. A remote server comprising: a processor; a communications interface configured to receive motion data and vital sign data from one or more motion sensors and one or more vital sign sensors, or from a mobile device; and a memory comprising instructions which, when executed by the processor, cause the remote server to perform the method of any of clauses 1 to 53.

57. A system for identifying potential personal safety incidents of an individual, the system comprising: one or more motion sensors and one or more vital sign sensors; a mobile device comprising a processor, a communications interface configured to receive motion data from one or more motion sensors and vital sign data one or more vital sign sensors, and a memory; and a remote server comprising a processor, a communications interface, and a memory; wherein the mobile device is configured to transmit the motion data and vital sign data to the remote server; and wherein the memory of the remote server comprises instructions which, when executed by the processor of the remote server, cause the remote server to perform the method of any of clauses 1 to 53.

58. The system according to clause 57, wherein the sample data set and/or the plurality of training data sets are received at the remote server from the mobile device.

59. A device for responding to personal safety incidents of an individual, the device comprising: a wireless receiver configured to receive signals using a wireless communication protocol; an alarm configured to emit sound; and a processor configured to cause the alarm to emit sound in response to receiving a trigger signal via the wireless receiver.

60. The device according to clause 59, wherein the alarm is configured to emit high-volume sound, preferably between around 100 dB and around 300 dB or between around 120 dB and around 200 dB, more preferably between around 130 dB and around 180 dB.

61. The device according to clause 59 or 60, wherein the wireless communication protocol is one of Bluetooth®, Bluetooth® Low Energy, near-field communication, RFID or Zigbee®.

62. The device according to any of clauses 59 to 61, wherein the processor is further configured to stop the alarm from emitting sound in response to receiving a stop signal via the wireless transceiver.

63. The device according to any of clauses 59 to 62, further comprising a mechanism configured to be manually activated and/or deactivated, wherein the processor is further configured to cause the alarm to emit sound in response to the mechanism being manually activated.

64. The device according to clause 63, wherein the processor is further configured to stop the alarm from emitting sound in response to the mechanism being manually activated.

65. The device according to clause 64 as dependent on clause 62, wherein the processor is configured to stop the alarm from emitting sound in response to the mechanism being manually activated only once the stop signal has been received.

66. The device according to any of clauses 59 to 65, further comprising a magnetic fastener.

67. The system according to clause 57 or 58, further comprising a device according to any of clauses 59 to 66.

The invention claimed is:

1. A method for identifying potential personal safety incidents comprising an attack on an individual, the method comprising the steps of:

receiving a sample data set comprising:

motion data from one or more motion sensors associated with the individual; and vital sign data from one or more vital sign sensors associated with the individual, the vital sign data comprising heart rate data;

determining a plurality of sample features based on the motion data and the vital sign data, the plurality of sample features comprising one or more motion features and one or more vital sign features, wherein determining the one or more vital sign features comprises determining, based on the heart rate data, a measure of heart rate variability;

determining whether the sample data set is indicative of a potential personal safety incident comprising an attack on the individual based on a model and on the one or more motion features and the one or more vital sign features comprising the measure of heart rate variability, the model configured to relate features derivable from motion data and vital sign data to potential personal safety incidents comprising an attack; and outputting the determination of whether the sample data set is indicative of a potential personal safety incident comprising an attack on the individual.

2. The method according to claim 1, wherein the motion data is received from at least a first motion sensor and a second motion sensor associated with the individual;

wherein determining the one or more motion features comprises determining a first motion feature from the motion data from the first motion sensor and determining a second motion feature from the motion data from the second motion sensor; and wherein determining whether the sample data set is indicative of a potential personal safety incident is based on both the first motion feature and the second motion feature.

3. The method according to claim 1, wherein determining the plurality of sample features comprises the step of filtering at least a portion of the sample data set based on frequency.

4. The method according to claim 3, wherein determining the plurality of sample features comprises the step of filtering the motion data based on a plurality of frequency bands.

5. The method according to claim 1, wherein determining the plurality of sample features comprises the step of transforming the motion data into a frequency domain to produce first transformed motion data.

6. The method according to claim 1, wherein determining the plurality of sample features comprises the step of transforming the motion data into a time-frequency domain to produce second transformed motion data.

7. The method according to claim 4, wherein determining one or more motion features comprises the step of determining, for each of one or more of the frequency bands, one or more sample motion features based on the filtered motion data within that frequency band.

8. The method according to claim 1, wherein the measure of heart rate variability comprises a ratio of a low-frequency heart rate variability to a high-frequency heart rate variability, wherein the low-frequency heart rate variability corresponds to heart rate signal frequencies below a threshold frequency and the high-frequency heart rate variability corresponds to heart rate signal frequencies above the threshold frequency.

9. The method according to claim 1, wherein the motion data comprises acceleration data and/or gyroscope data.

10. The method according to claim 1, further comprising the step of determining one or more responses based on the determination of whether the sample data set is indicative of a potential personal safety incident.

11. The method according to claim 1, further comprising the step of assigning one or more probabilities associated with the determination of whether the sample data set is indicative of a potential personal safety incident based on the model and the plurality of sample features.

12. The method according to claim 1, wherein the model is a recurrent neural network configured to receive as input the plurality of sample features and provide as output a determination of whether the sample data set is indicative of a potential personal safety incident.

13. The method according to claim 1, wherein the potential personal safety incident comprises at least one of:
- the individual experiencing fear;
- the individual experiencing surprise; and
- the individual struggling; and/or
- wherein the model is configured to:
  - determine a level of stress of the individual indicated by the motion data;
  - determine a level of stress of the individual indicated by the vital sign data; and
  - determine whether the sample data set is indicative of a potential personal safety incident of the individual based on a difference between the level of stress indicated by the motion data and by the vital sign data.

14. The method according to claim 10, further comprising the steps of:
- sending to the individual a personal safety verification request; and
- monitoring for a user input via a user interface, the user input being in response to the request;
- wherein determining the one or more responses is further based on the outcome of monitoring for the user input.

15. The method according to claim 10, wherein the one or more determined responses comprise triggering an alarm, wherein the alarm is triggered on an alarm device configured, in response to the alarm being triggered, to emit a high-volume sound, between around 100 dB and around 300 dB or between around 120 dB and around 200 dB.

16. The method according to claim 1, further comprising the step of:
- determining a sampling frequency associated with the sample data set;
- wherein the plurality of sample features is determined if the sampling frequency is above a sampling frequency threshold.

17. A method of training a model for relating one or more potential personal safety incidents comprising an attack on an individual to features derivable from a data set comprising motion data and vital sign data, the method comprising:
- receiving a plurality of training data sets, each training set comprising motion data from one or more motion sensors associated with an individual over a training time period and vital sign data from one or more vital sign sensors associated with the individual over the training time period, the vital sign data comprising heart rate data;
- receiving for each training data set a label indicative of whether conditions corresponding to a personal safety incident comprising an attack on the individual occurred during the training time period;
- determining for each training data set a plurality of training features based on the motion data and the vital sign data, the plurality of training features comprising one or more motion features and one or more vital sign features, wherein determining the one or more vital sign features comprises determining, based on the heart rate data, a measure of heart rate variability;
- determining a measure of dependence between the labels and the one or more motion features and the one or more vital sign features comprising the measure of heart rate variability; and
- creating a model based on the determined measure of dependence, wherein the model is configured to relate a potential personal safety incident comprising an attack on an individual to features derivable from a data set comprising motion data and vital sign data.

18. A system for identifying potential personal safety incidents comprising an attack on an individual, the system comprising:
- one or more motion sensors and one or more vital sign sensors;
- a mobile device comprising a processor, a communications interface configured to receive motion data from one or more motion sensors and vital sign data from one or more vital sign sensors, and a memory, wherein the vital sign data comprises heart rate data; and
- a remote server comprising a processor, a communications interface, and a memory;
- wherein the mobile device is configured to transmit the motion data and vital sign data to the remote server; and
- wherein the memory of the remote server comprises instructions which, when executed by the processor of the remote server, cause the remote server to perform the method of claim 1.

19. The method according to claim 1, wherein the measure of heart rate variability is indicative of whether the individual is experiencing stress.

20. The method according to claim 1, wherein determining the one or more motion features comprises determining, based on the motion data, one or more motion features indicative of whether motion of the individual is erratic.

* * * * *